(12) United States Patent
Fukuzawa et al.

(10) Patent No.: US 8,973,446 B2
(45) Date of Patent: Mar. 10, 2015

(54) PRESSURE SENSOR AND MICROPHONE

(71) Applicants: Hideaki Fukuzawa, Kanagawa-ken (JP); Akihiko Enamito, Kanagawa-ken (JP); Osamu Nishimura, Kanagawa-ken (JP); Michiko Hara, Kanagawa-ken (JP); Hiromi Yuasa, Kanagawa-ken (JP); Yoshihiko Fuji, Kanagawa-ken (JP); Masayuki Kii, Kanagawa-ken (JP); Eizo Fujisawa, Kanagawa-ken (JP)

(72) Inventors: Hideaki Fukuzawa, Kanagawa-ken (JP); Akihiko Enamito, Kanagawa-ken (JP); Osamu Nishimura, Kanagawa-ken (JP); Michiko Hara, Kanagawa-ken (JP); Hiromi Yuasa, Kanagawa-ken (JP); Yoshihiko Fuji, Kanagawa-ken (JP); Masayuki Kii, Kanagawa-ken (JP); Eizo Fujisawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 39 days.

(21) Appl. No.: 13/730,016

(22) Filed: Dec. 28, 2012

(65) Prior Publication Data

US 2013/0255393 A1      Oct. 3, 2013

(30) Foreign Application Priority Data

Mar. 29, 2012 (JP) ................................. 2012-078361

(51) Int. Cl.
*G01B 7/16* (2006.01)
*G01L 9/00* (2006.01)
*G01L 9/16* (2006.01)
*G01L 1/12* (2006.01)

(52) U.S. Cl.
CPC . *G01L 1/12* (2013.01); *G01L 9/008* (2013.01); *G01L 9/16* (2013.01); *G01L 9/005* (2013.01)

USPC ........................................................... 73/779

(58) Field of Classification Search
USPC ......... 73/760, 779, 862.69, 862.331–861.335
See application file for complete search history.

(56) References Cited

U.S. PATENT DOCUMENTS

| 8,359,931 B2 * | 1/2013 | Nishiwaki ........................ 73/846 |
| 8,640,550 B2 * | 2/2014 | Nishiwaki ........................ 73/846 |
| 2006/0246271 A1 | 11/2006 | Quandt et al. |

(Continued)

FOREIGN PATENT DOCUMENTS

| JP | 60-46049 U | 4/1985 |
| JP | 60-253830 A | 12/1985 |

(Continued)

OTHER PUBLICATIONS

U.S. Appl. No. 13/536,002, filed Jun. 28, 2012, Hideaki Fukuzawa, et al.

(Continued)

*Primary Examiner* — Max Noori
(74) *Attorney, Agent, or Firm* — Oblon, Spivak, McClelland, Maier & L.L.P.

(57) ABSTRACT

According to one embodiment, a pressure sensor includes a base, and a first sensor unit. The first sensor unit includes a first transducer thin film, a first strain sensing device and a second strain sensing device. The first strain sensing device includes a first magnetic layer, a second magnetic layer, and a first intermediate layer provided between the first and the second magnetic layers. The second strain sensing device is provided apart from the first strain sensing device on the first membrane surface and provided at a location different from a location of the barycenter, the second strain sensing device including a third magnetic layer, a fourth magnetic layer, and a second intermediate layer provided between the third and the fourth magnetic layers, the first and the second intermediate layers being nonmagnetic. The first and the second strain sensing devices, and the barycenter are in a straight line.

32 Claims, 21 Drawing Sheets

(56) References Cited

U.S. PATENT DOCUMENTS

| | | |
|---|---|---|
| 2009/0001974 A1* | 1/2009 | Sheiretov et al. .......... 324/209 |
| 2009/0200620 A1 | 8/2009 | Omura et al. |
| 2011/0295128 A1 | 12/2011 | Yuasa et al. |
| 2012/0079887 A1 | 4/2012 | Giddings et al. |
| 2012/0245477 A1 | 9/2012 | Giddings et al. |
| 2013/0170669 A1* | 7/2013 | Fukuzawa et al. .......... 381/115 |

FOREIGN PATENT DOCUMENTS

| | | |
|---|---|---|
| JP | 61-96347 | 6/1986 |
| JP | 7-174645 | 7/1995 |
| JP | 2007-180201 | 7/2007 |
| JP | 2009-164851 A | 7/2009 |

OTHER PUBLICATIONS

Japanese Office Action issued Apr. 25, 2014 in Patent Application No. 2012-078361 with English Translation.
U.S. Appl. No. 14/197,448, filed Mar. 5, 2014, Fuji, et al.
Office Action mailed Oct. 31, 2014 in Japanese Application No. 2012-078361 filed Mar. 29, 2012 (w/English translation).

* cited by examiner

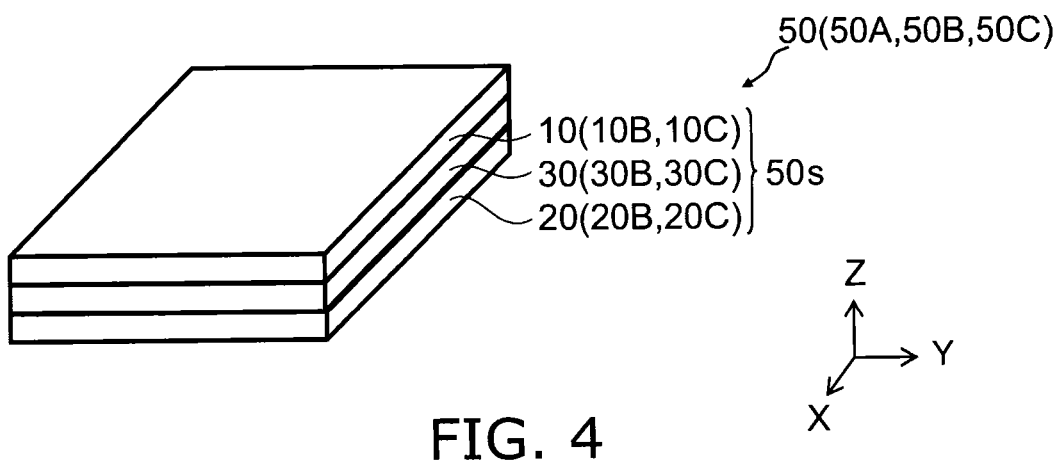
FIG. 4
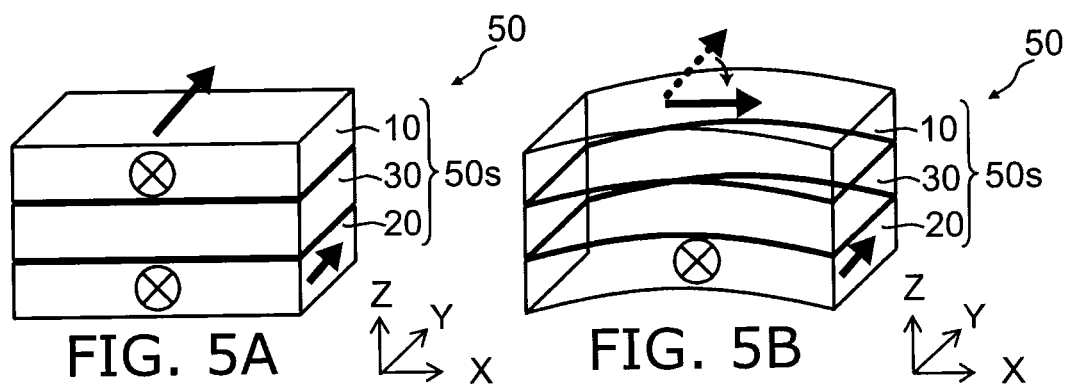
FIG. 5A
FIG. 5B
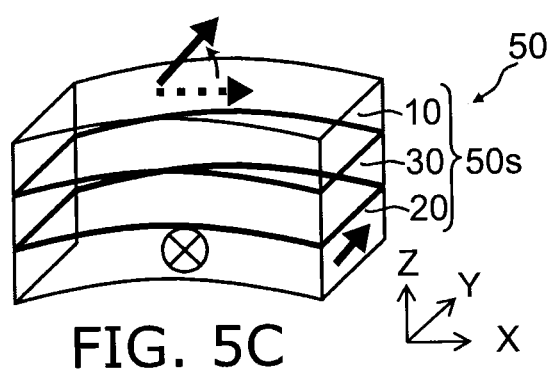
FIG. 5C

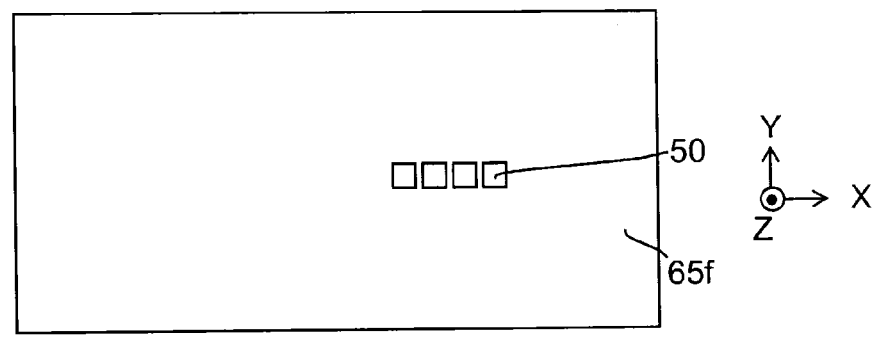
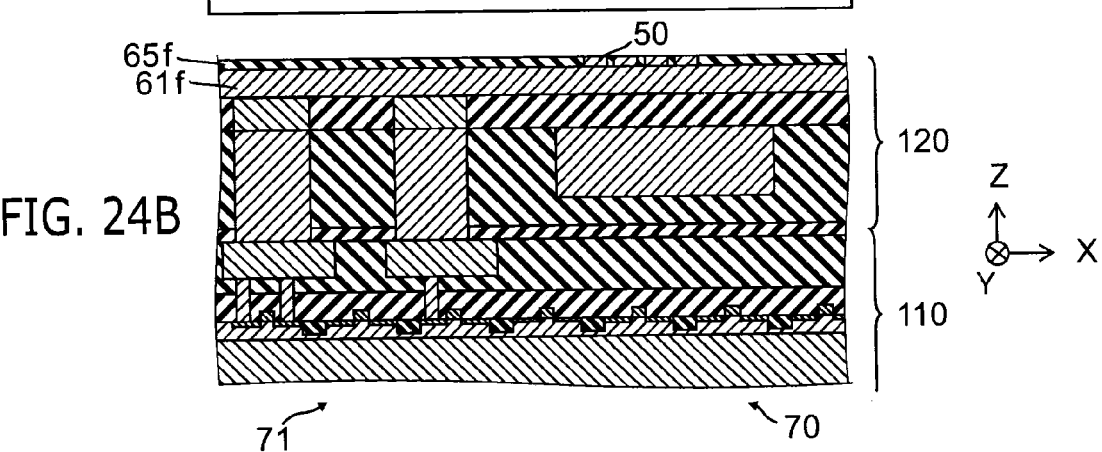
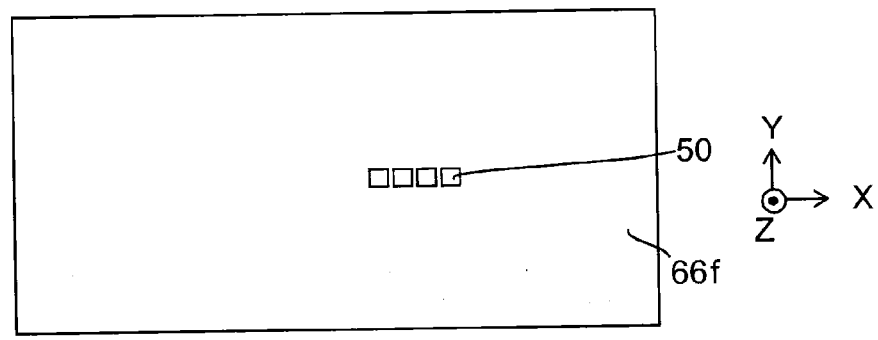
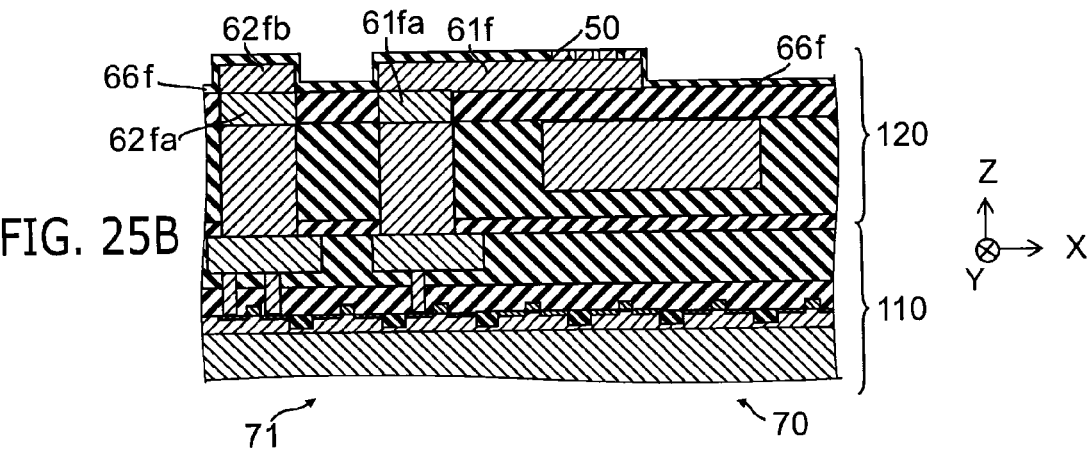

PRESSURE SENSOR AND MICROPHONE

CROSS-REFERENCE TO RELATED APPLICATIONS

This application is based upon and claims the benefit of priority from the prior Japanese Patent Application No. 2012-078361, filed on Mar. 29, 2012; the entire contents of which are incorporated herein by reference.

FIELD

Embodiments described herein relate generally to a pressure sensor and a microphone.

BACKGROUND

In a capacitive microphone that converts sounds into electrical signals using a change in capacitance, a diaphragm entirely becomes a part of an electrode, and when the microphone is downsized, the areas of the diaphragm and the electrode are also reduced, causing the deterioration of sensitivity.

BRIEF DESCRIPTION OF THE DRAWINGS

FIG. 4 is a schematic perspective view illustrating a configuration of a part of the pressure sensor according to the first embodiment;

FIG. 5A to FIG. 5C are schematic perspective views illustrating an operation of the pressure sensor according to the first embodiment;

FIG. 18A, FIG. 18B, FIG. 19A, FIG. 19B, FIG. 20A, FIG. 20B, FIG. 21A, FIG. 21B, FIG. 22A, FIG. 22B, FIG. 23A, FIG. 23B, FIG. 24A, FIG. 24B, FIG. 25A, FIG. 25B, FIG. 26A, FIG. 26B, FIG. 27A, FIG. 27B, FIG. 28A, FIG. 28B, FIG. 29A, and FIG. 29B are schematic views illustrating a method for manufacturing a pressure sensor according to a seventh embodiment;

DETAILED DESCRIPTION

Figure 1:
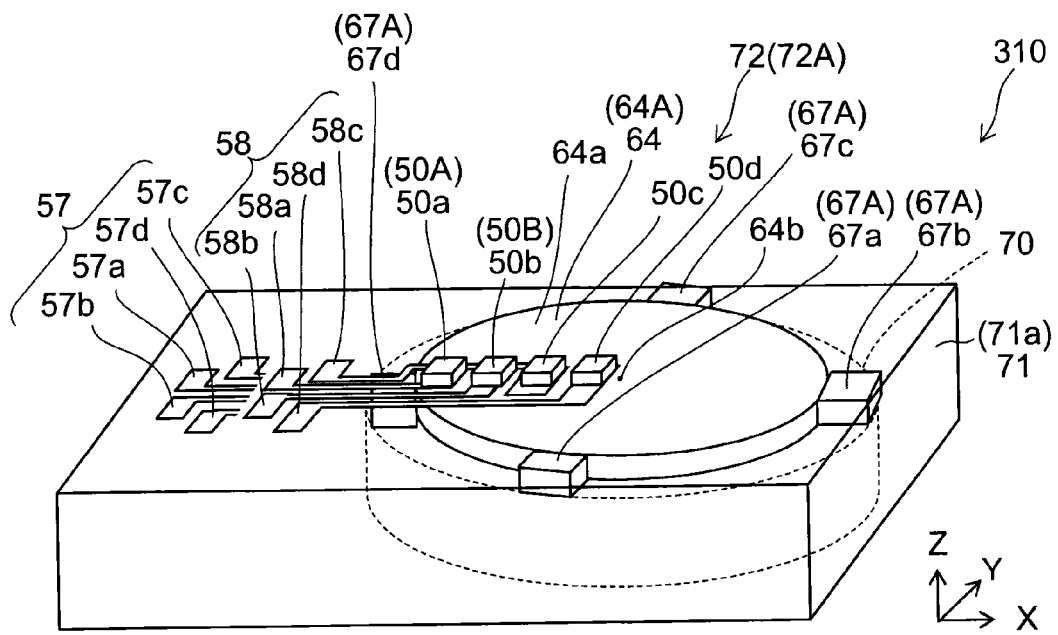
FIG. 1 is a schematic perspective view illustrating a configuration of a pressure sensor according to a first embodiment.

In general, according to one embodiment, a pressure sensor includes a base and a first sensor unit. The first sensor unit is provided on the base and includes a first transducer thin film, a first strain sensing device, and a second strain sensing device. The first transducer is flexible and has a first membrane surface. The first strain sensing device is provided at a location on the first membrane surface different from a location of a barycenter of the first membrane surface. The first strain sensing device includes a first magnetic layer, a second magnetic layer and a first intermediate layer. The first intermediate layer is nonmagnetic and provided between the first magnetic layer and the second magnetic layer. The second strain sensing device is provided apart from the first strain sensing device on the first membrane surface and provided at a location different from a location of the barycenter. The second strain sensing device includes a third magnetic layer, a fourth magnetic layer, and a second intermediate layer. The second intermediate layer is nonmagnetic and provided between the third magnetic layer and the fourth magnetic layer. The first strain sensing device, the second strain sensing device, and the barycenter are in a straight line.

In general, according to another embodiment, a pressure sensor includes a base and a first sensor unit. The first sensor unit is provided on the base and includes a first transducer thin film, a first strain sensing device, and a second strain sensing device. The first transducer thin film is flexible and has a first membrane surface. The first strain sensing device is provided at a location on the first membrane surface different from a location of a barycenter of the first membrane surface. The first strain sensing device includes a first magnetic layer, a second magnetic layer and a first intermediate layer. The first intermediate layer is nonmagnetic and provided between the first magnetic layer and the second magnetic layer. The second strain sensing device includes a third magnetic layer, a fourth magnetic layer, and a second intermediate layer. The second intermediate layer is nonmagnetic and provided between the third magnetic layer and the fourth magnetic layer. A distance between the first strain sensing device and the barycenter is the same as a distance between the second strain sensing device and the barycenter.

In general, according to another embodiment, a pressure sensor includes a base, a first sensor unit, and a processing circuit. The first sensor unit is provided on the base and includes a first transducer thin film, a first strain sensing device, and a second strain sensing device. The first transducer is flexible and has a first membrane surface. The first strain sensing device is provided at a location on the first membrane surface different from a location of a barycenter of the first membrane surface. The first strain sensing device includes a first magnetic layer, a second magnetic layer and a first intermediate layer. The first intermediate layer is nonmagnetic and provided between the first magnetic layer and the second magnetic layer. The second strain sensing device is provided apart from the first strain sensing device on the first membrane surface and provided at a location different from a location of the barycenter. The second strain sensing device includes a third magnetic layer, a fourth magnetic layer, and a second intermediate layer. The second intermediate layer is nonmagnetic and provided between the third magnetic layer and the fourth magnetic layer. The processing circuit is configured to process a first signal obtained from the first strain sensing device and a second signal obtained from the second strain sensing device. The processing circuit is configured to perform at least one of an adding process of the first signal and the second signal, a subtracting process of the first signal and the second signal, and a multiplying process of the first signal and the second signal.

In general, according to another embodiment, a microphone includes a pressure sensor. The pressure sensor includes a base and a first sensor unit. The first sensor unit is provided on the base and includes a first transducer thin film, a first strain sensing device, and a second strain sensing device. The first transducer is flexible and has a first membrane surface. The first strain sensing device is provided at a location on the first membrane surface different from a location of a barycenter of the first membrane surface. The first strain sensing device includes a first magnetic layer, a second magnetic layer, and a first intermediate layer. The first intermediate layer is nonmagnetic and provided between the first magnetic layer and the second magnetic layer. The second strain sensing device is provided apart from the first strain sensing device on the first membrane surface and provided at a location different from a location of the barycenter. The second strain sensing device includes a third magnetic layer, a fourth magnetic layer, and a second intermediate layer. The second intermediate layer is nonmagnetic and provided between the third magnetic layer and the fourth magnetic layer. The first strain sensing device, the second strain sensing device, and the barycenter are in a straight line.

In general, according to another embodiment, a microphone includes a pressure sensor. The pressure sensor includes a base and a first sensor unit. The first sensor unit is provided on the base and includes a first transducer thin film, a first strain sensing device, and a second strain sensing device. The first transducer thin film is flexible and has a first membrane surface. The first strain sensing device is provided at a location on the first membrane surface different from a location of a barycenter of the first membrane surface. The first strain sensing device includes a first magnetic layer, a second magnetic layer, and a first intermediate layer. The first intermediate layer is nonmagnetic and provided between the first magnetic layer and the second magnetic layer. The second strain sensing device includes a third magnetic layer, a fourth magnetic layer, and a second intermediate layer. The second intermediate layer is nonmagnetic and provided between the third magnetic layer and the fourth magnetic layer. A distance between the first strain sensing device and the barycenter is the same as a distance between the second strain sensing device and the barycenter.

In general, according to another embodiment, a microphone includes a pressure sensor. The pressure sensor includes a base, a first sensor unit, and a processing circuit. The first sensor unit is provided on the base and includes a first transducer thin film, a first strain sensing device, and a second strain sensing device. The first transducer is flexible and has a first membrane surface. The first strain sensing device is provided at a location on the first membrane surface different from a location of a barycenter of the first membrane surface. The first strain sensing device includes a first magnetic layer, a second magnetic layer and a first intermediate layer. The first intermediate layer is nonmagnetic and provided between the first magnetic layer and the second magnetic layer. The second strain sensing device is provided apart from the first strain sensing device on the first membrane surface and provided at a location different from a location of the barycenter. The second strain sensing device includes a third magnetic layer, a fourth magnetic layer, and a second intermediate layer. The second intermediate layer is nonmagnetic and provided between the third magnetic layer and the fourth magnetic layer. The processing circuit is configured to process a first signal obtained from the first strain sensing device and a second signal obtained from the second strain sensing device. The processing circuit is configured to perform at least one of an adding process of the first signal and the second signal, a subtracting process of the first signal and the second signal, and a multiplying process of the first signal and the second signal.

Various embodiments will be described hereinafter with reference to the accompanying drawings.

It is noted that the drawings are schematic or conceptual. The relationship between the thicknesses and widths of portions, a ratio of size between portions, or the like are not necessarily the same as real ones. Moreover, even in the case of expressing the same portions, dimensions and ratios between the portions are sometimes expressed differently depending on the drawings.

In the specification and drawings, components similar to those described or illustrated in a drawing thereinabove are marked with the identical reference numerals, and a detailed description is omitted as appropriate.

First Embodiment

FIG. 1 is a schematic perspective view illustrating the configuration of a pressure sensor according to a first embodiment.

In FIG. 1, for easily seeing the drawing, insulating portions are omitted, and conducting portions are mainly depicted.

Figure 2:
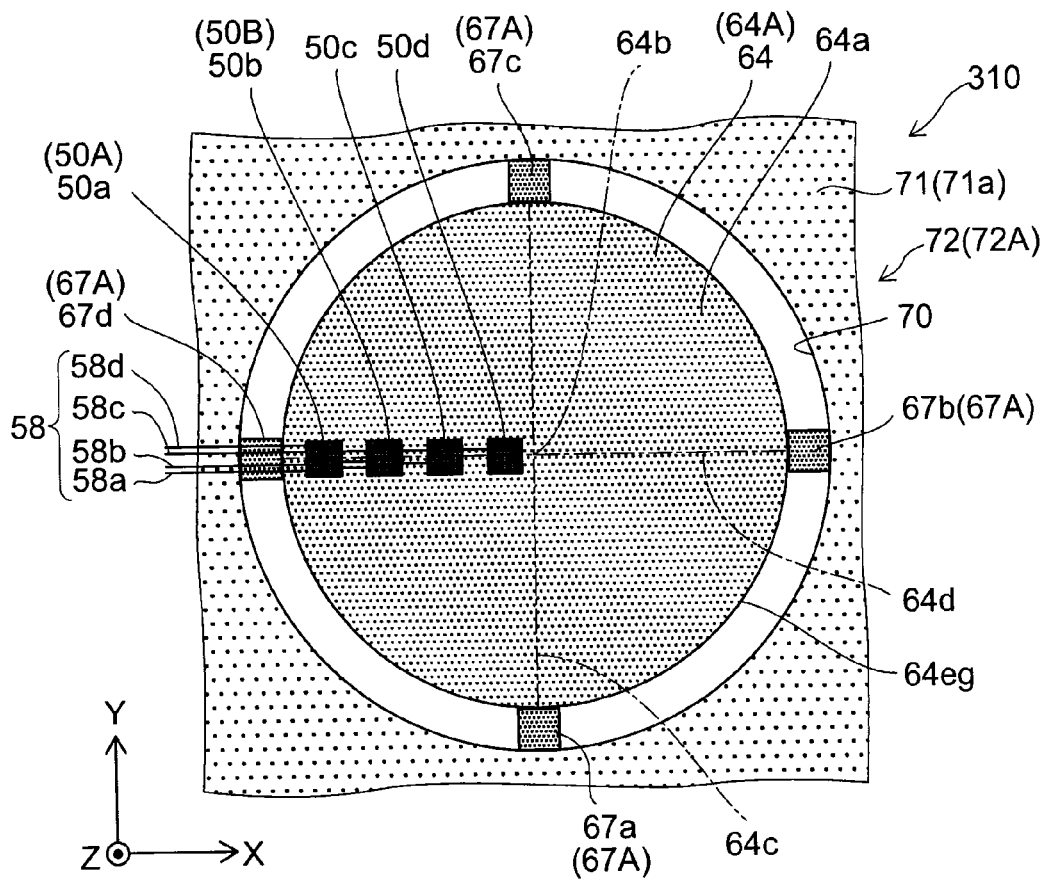
FIG. 2 is a schematic plan view illustrating a configuration of a part of the pressure sensor according to the first embodiment.
Figure 3A:
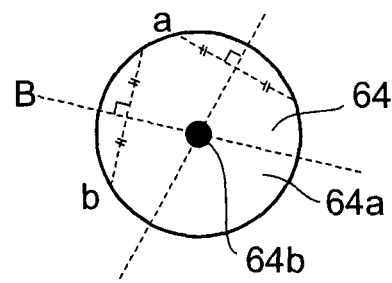
FIG. 3A to FIG. 3D are schematic plan views illustrating a configurations of a part of the pressure sensor according to the first embodiment.
Figure 3B:
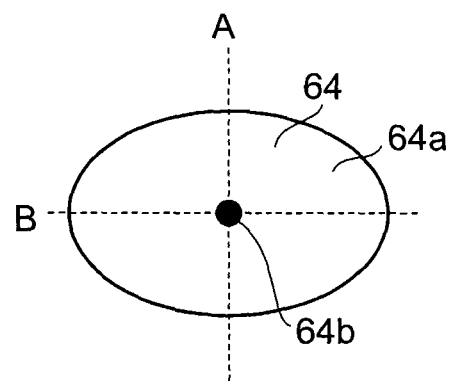
Figure 3C:
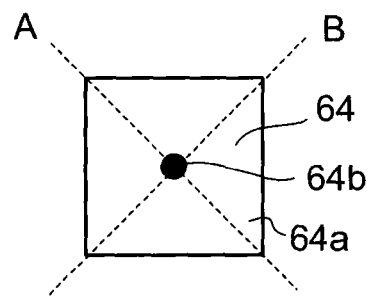
Figure 3D:
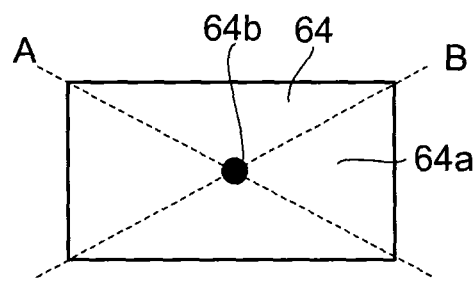

FIG. 2 is a schematic plan view illustrating the configuration of a part of the pressure sensor according to the first embodiment.

As shown in FIG. 1, a pressure sensor 310 according to the embodiment includes a base 71a and a sensor unit 72 (a first sensor unit 72A). The sensor unit 72 is provided on the base 71a. The sensor unit 72 (the first sensor unit 72A) includes a first transducer thin film 64A, a first fixing unit 67A, and a first strain sensing device 50A. The first transducer thin film 64A has a membrane surface 64a (a first membrane surface). The first transducer thin film 64A is flexible. The first transducer thin film 64A is deformed when an external pressure is applied, and has a function of transducing the deformation as strain to a strain sensing device 50 formed on the first transducer thin film 64A. An external pressure includes pressure itself, and also includes pressure caused by acoustic waves and ultrasonic waves, for example. In the case of acoustic waves, ultrasonic waves, or the like, the pressure sensor functions as a microphone.

A thin film to be a transducer thin film 64 is sometimes continuously formed on the outer side of a portion that is deformed by an external pressure. In the specification, a portion that is surrounded by a fixing end, has the film thickness thinner than the thickness of the fixing end in a certain thickness, and is deformed by an external pressure is referred to as a transducer thin film.

The first fixing unit 67A fixes the first transducer thin film 64A to the base 71a. The first strain sensing device 50A is provided on the first membrane surface. The configuration of the first strain sensing device 50A will be described later.

The base 71a is formed with a caving portion 70. Portions other than the caving portion 70 in the base 71a correspond to a non-cavity portion 71. The non-cavity portion 71 is disposed side by side on the caving portion 70.

The caving portion 70 is a portion where a material to form the non-cavity portion 71 is not provided. The inside of the caving portion 70 may be vacuum (a low pressure state lower than one atmospheric pressure), or the inside of the caving portion 70 may be filled with a gas such as air and an inert gas. A liquid may be filled in the caving portion 70. A deformable substance may be disposed in the caving portion 70 so as to deform the first transducer thin film 64A.

When an external pressure (including sounds, ultrasonic waves, or the like) is applied to the first transducer thin film 64A, the first transducer thin film 64A is deformed to generate strain in a strain sensor (the sensor unit 72) disposed on the first transducer thin film 64A. The first transducer thin film 64A transmits (transduces) a pressure signal to the sensor unit 72, and the pressure signal is converted into a strain signal at the sensor unit 72.

The first transducer thin film 64A is disposed above the caving portion 70, and the first transducer thin film 64A is fixed to the base 71a with the first fixing unit 67A.

Here, suppose that a plane parallel with the membrane surface 64a (the first membrane surface) is an X-Y plane. In the case where the membrane surface 64a is not flat, a plane including an edge portion 64eg of the membrane surface 64a is the X-Y plane. A direction vertical to the X-Y plane is a Z-axis direction.

As shown in FIG. 1 and FIG. 2, in the pressure sensor 310, the base 71a, the transducer thin film 64 (the first transducer thin film 64A), the first fixing unit 67A (fixing units 67a to 67d), the first strain sensing device 50A, a first interconnection 57 (interconnections 57a to 57d), and a second interconnection 58 (interconnections 58a to 58d) are provided. In this example, a plurality of the strain sensing devices 50 (strain sensing devices 50a to 50d) are provided. The first strain sensing device 50A is one of the strain sensing devices 50. For example, the strain sensing device 50a is used for the first strain sensing device 50A. However, in the embodiment, a single strain sensing device 50 (the first strain sensing device 50A) may be provided.

Namely, the sensor unit 72 (the first sensor unit 72A) further includes a second strain sensing device 50B. The second strain sensing device 50B is provided on the membrane surface 64a. The strain sensing device 50b is used for the second strain sensing device 50B, for example. In this example, a straight line passing through the first strain sensing device 50A and the second strain sensing device 50B passes through a barycenter 64b of the membrane surface 64a. More specifically, a straight line passing through the barycenter of the first strain sensing device 50A and the barycenter of the second strain sensing device 50B passes through the barycenter 64b. In other words, in this example, the first strain sensing device 50A, the second strain sensing device 50B, and a barycenter 64b of the membrane surface 64a are in the straight line. More specifically, the barycenter of the first strain sensing device 50A, the barycenter of the second strain sensing device 50B, and the barycenter 64b are in the straight line.

In this example, four strain sensing devices 50 (the strain sensing devices 50a to 50d) are provided. The strain sensing devices 50a to 50d are disposed from the center (corresponding to the barycenter 64b) of a straight line 64d to the X-axis direction side on the membrane surface 64a. The strain sensing devices 50 are disposed at locations different from the location of the barycenter 64b of the membrane surface 64a of the transducer thin film 64.

FIG. 3A to FIG. 3D are schematic plan views illustrating the configurations of a part of the pressure sensor according to the first embodiment.

These drawings illustrate the shapes of the membrane surface 64a of the transducer thin film 64.

As shown in FIG. 3A to FIG. 3D, the shape of the membrane surface 64a of the transducer thin film 64 (a deformed portion) is a circular shape, a flat circle (including an ellipse), a square, a rectangle, etc. In the case of these shapes, the barycenter of the membrane surface 64a is the center of a circle, the center of an ellipse, the center of the diagonal lines of a square, or the center of the diagonal lines of a rectangle.

The transducer thin film 64 is formed of an insulating layer, for example. Alternatively, the transducer thin film 64 is formed of a metal material, for example. The transducer thin film 64 includes silicon oxide, silicon nitride, or the like, for example. The thickness of the transducer thin film 64 is 200 nm or more and 3 μm or less, for example, and preferably, 300 nm or more and 1.5 m or less. The diameter of the transducer thin film 64 is 1 μm or more and 600 μm or less, for example, and more preferably, 60 μm or more and 600 μm or less. The transducer thin film 64 is flexible in the Z-axis direction vertical to the membrane surface 64a, for example.

In this example, the first fixing unit 67A includes the fixing units 67a to 67d.

As shown in FIG. 2, in this example, the fixing units 67a and 67c are disposed at the intersection points of a straight line 64c and the edge portion 64eg of the transducer thin film 64. The straight line 64c passes through the barycenter 64b of the membrane surface 64a of the transducer thin film 64, and is parallel with the Y-axis direction. The fixing unit 67b and the fixing unit 67d are disposed at the intersection points of the straight line 64d and the edge portion 64eg of the transducer thin film 64. The straight line 64d passes through the barycenter 64b of the membrane surface 64a of the transducer thin film 64, and is parallel with the X-axis direction. The fixing units 67a to 67d fix the transducer thin film 64 to the non-cavity portion 71 (the base 71a).

The fixing units 67a to 67d include silicon that is a part of a substrate material, a material the same as the material of the transducer thin film formed on a substrate material, or the like, for example. The fixing units 67a to 67d are portions formed of films thicker than the film thickness of the transducer thin film 64 so as not to tend to be deformed even when an external pressure is applied.

One ends of the strain sensing devices 50a to 50d are individually connected to the first interconnections 57 (the interconnections 57a to 57d, for example). The other ends of the strain sensing devices 50a to 50d are individually connected to the second interconnections 58 (the interconnections 58a to 58d, for example).

The first interconnection 57 and the second interconnection 58 pass through on the fixing unit 67, or in the fixing unit 67, and extend from the strain sensing device 50 to the base 71a.

FIG. 4 is a schematic perspective view illustrating the configuration of a part of the pressure sensor according to the first embodiment. FIG. 4 shows an exemplary configuration of the strain sensing device 50. As shown in FIG. 4, the strain sensing device 50 (for example, the first strain sensing device 50A) includes a strain resistance change unit 50s. The strain resistance change unit 50s includes a first magnetic layer 10, a second magnetic layer 20, and an intermediate layer 30 (a first intermediate layer) provided between the first magnetic layer 10 and the second magnetic layer 20, for example. The intermediate layer 30 is a non-magnetic layer. The configuration of each of the strain sensing devices 50 are the same as the configuration above. For example, the second strain sensing device 50B includes a third magnetic layer 10B, a fourth magnetic layer 20B, and a second intermediate layer 30B provided between the third magnetic layer 10B and the fourth magnetic layer 20B, and the second intermediate layer 30B is nonmagnetic. The configuration of the third magnetic layer 10B is the same as the configuration of the first magnetic layer 10. The configuration of the fourth magnetic layer 20B is the same as the configuration of the second magnetic layer 20. The configuration of the second intermediate layer 30B is the same as the configuration of the first intermediate layer 30. The configurations of the first magnetic layer 10, the second magnetic layer 20, and the intermediate layer 30 described below can be applied to the configurations of the third magnetic layer 10B, the fourth magnetic layer 20B, and the second intermediate layer 30B.

In this example, the first magnetic layer 10 is a magnetization free layer. The second magnetic layer 20 is a magnetization fixed layer or a magnetization free layer, for example.

In the following, an exemplary operation of the strain sensing device 50 will be described in the case where the second magnetic layer 20 is a magnetization fixed layer and the first magnetic layer 10 is a magnetization free layer. In the strain sensing device 50, "an inverse magnetostrictive effect" of a ferromagnetic body and "an MR effect" shown in the strain resistance change unit 50s are used.

"The MR effect" is a phenomenon that when an external magnetic field is applied in a stacked film having a magnetic substance, the electrical resistance value of the stacked film is varied according to a change in the magnetization of the magnetic substance. The MR effect includes the GMR (Giant Magnetoresistance) effect, the TMR (Tunneling Magnetoresistance) effect, or the like, for example. A current is passed through the strain resistance change unit 50s, and a change in a relative angle between the orientations of magnetization is read as a change in the electrical resistance, so that the MR effect is shown. For example, tensile stress is applied to the strain resistance change unit 50s based on stress applied to the strain sensing device 50. When the orientation of the magnetization of the first magnetic layer 10 (a magnetization free layer) is different from the direction of tensile stress applied to the second magnetic layer 20, the MR effect is shown by the inverse magnetostrictive effect. ΔR/R is "an MR change rate", where a lower resistance is R, and the change value of the electrical resistance varied by the MR effect is ΔR.

FIG. 5A to FIG. 5C are schematic perspective views illustrating the operation of the pressure sensor according to the first embodiment.

These drawings illustrate the states of the strain sensing device 50. These drawings illustrate the relationship between the magnetization direction and the tensile stress direction in the strain sensing device 50.

FIG. 5A shows a state in which no tensile stress is applied. When no tensile stress is applied, in this example, the orientation of the magnetization of the second magnetic layer 20 (a magnetization fixed layer) is the same as the orientation of the magnetization of the first magnetic layer 10 (a magnetization free layer).

FIG. 5B shows a state in which tensile stress is applied. In this example, tensile stress is applied along the X-axis direction. For example, the transducer thin film 64 is deformed to apply tensile stress along the X-axis direction, for example. Namely, the tensile stress is applied in the direction orthogonal to the orientations of the magnetization of the second magnetic layer 20 (a magnetization fixed layer) and the first magnetic layer 10 (a magnetization free layer) (in the Y-axis direction, in the example). When applying tensile stress, the magnetization of the first magnetic layer 10 (a magnetization free layer) is rotated so as to be directed to the same direction as the tensile stress direction. This is "the inverse magnetostrictive effect". In the inverse magnetostrictive effect, the magnetization of the second magnetic layer 20 (a magnetization fixed layer) is fixed, so that the magnetization of the first magnetic layer 10 (a magnetization free layer) is rotated to change a relative angle between the orientation of the magnetization of the second magnetic layer 20 (a magnetization fixed layer) and the orientation of the magnetization of the first magnetic layer 10 (a magnetization free layer).

In the drawing, the magnetization direction of the second magnetic layer 20 (a magnetization fixed layer) is shown as an example. The magnetization direction may not be the direction shown in the drawing.

In the inverse magnetostrictive effect, the axis of easy magnetization is changed depending on the sign of the magnetostriction constant of the ferromagnetic body. Many materials showing a large inverse magnetostrictive effect have a positive magnetostriction constant. In the case where the magnetostriction constant is positive, the direction to which tensile stress is applied is the axis of easy magnetization as described above, and the magnetization of the first magnetic layer 10 (a magnetization free layer) is rotated in the direction of the axis of easy magnetization.

For example, in the case where the magnetostriction constant of the first magnetic layer 10 (a magnetization free layer) is positive, the magnetization direction of the first magnetic layer 10 (a magnetization free layer) is set to a direction different from the direction to which tensile stress is applied. On the other hand, in the case where the magnetostriction constant is negative, a direction vertical to the direction to which tensile stress is applied is the axis of easy magnetization.

FIG. 5C illustrate a state in the case where the magnetostriction constant is negative. In this case, the magnetization direction of the first magnetic layer 10 (a magnetization free layer) is set to a direction different from a direction vertical to the direction to which tensile stress is applied (in the X-axis direction in this example).

The drawing shows the magnetization direction of the second magnetic layer 20 (a magnetization fixed layer) as an example. The magnetization direction may not be the direction shown in the drawing.

The electrical resistance of the strain sensing device 50 (the strain resistance change unit 50s) is varied by the MR effect depending on an angle between the magnetization of the first magnetic layer 10 and the magnetization of the second magnetic layer 20, for example.

The magnetostriction constant (λs) expresses the magnitude of a change in the shape when an external magnetic field is applied to saturate and magnetize a ferromagnetic layer in a certain direction. Suppose that the shape is changed by ΔL when an external magnetic field is applied where a length is L with no external magnetic field, the magnetostriction constant λs is expressed by ΔL/L. Although this change value is changed depending on the magnitude of the magnetic field, the magnetostriction constant λs is expressed by ΔL/L in a state in which a sufficient magnetic field is applied and magnetization is saturated.

For example, in the case where the second magnetic layer 20 is a magnetization fixed layer, Fe, Co, or Ni or an alloy material of Fe, Co, and Ni is used for the second magnetic layer 20. A material added with an additional element to the materials, for example, is used for the second magnetic layer 20. A CoFe alloy, a CoFeB alloy, an NiFe alloy, or the like can be used for the second magnetic layer 20, for example. The thickness of the second magnetic layer 20 is 2 nanometers (nm) or more and 6 nm or less, for example.

A metal or an insulator can be used for the intermediate layer 30. For a metal, Cu, Au, Ag, or the like can be use, for example. In the case of a metal, the thickness of the intermediate layer 30 is 1 nm or more and 7 nm or less, for example. For an insulator, magnesium oxide (such as MgO), aluminum oxide (such as $Al_2O_3$), titanium oxide (such as TiO), and zinc oxide (such as ZnO) can be used, for example. In the case of an insulator, the thickness of the intermediate layer 30 is 1 nm or more and 3 nm or less, for example.

In the case where the first magnetic layer 10 is a magnetization free layer, at least one of Fe, Co, and Ni, or an alloy material containing at least one of Fe, Co, and Ni is used for the first magnetic layer 10, for example. A material added with an additional element to the materials is used.

A material of a large magnetostriction is used for the first magnetic layer 10. More specifically, a material that the absolute value of magnetostriction is large than $10^{-5}$ is used, so that magnetization is sensitively changed with respect to strain. For the first magnetic layer 10, a material of a positive magnetostriction may be used, or a material of a negative magnetostriction may be used.

An FeCo alloy, an NiFe alloy, or the like can be used for the first magnetic layer 10, for example. In addition to this, for the first magnetic layer 10, an Fe—Co—Si—B alloy, a Tb-M-Fe alloy showing λs>100 ppm (where M is Sm, Eu, Gd, Dy, Ho, or Er), a Tb-M1-Fe-M2 alloy (where M1 is Sm, Eu, Gd, Dy, Ho, or Er, and M2 is Ti, Cr, Mn, Co, Cu, Nb, Mo, W, or Ta), a Fe-M3-M4-B alloy (where M3 is Ti, Cr, Mn, Co, Cu, Nb, Mo, W, or Ta, and M4 is Ce, Pr, Nd, Sm, Tb, Dy, or Er), Ni, Al—Fe, ferrite (such as $Fe_3O_4$, $(FeCo)_3O_4$)), or the like can be used. The thickness of the first magnetic layer 10 is 2 nm or more, for example.

The first magnetic layer 10 can have a two layer structure. In this case, the first magnetic layer 10 can include a FeCo alloy layer and the following layer stacked on the FeCo alloy layer. The layer to be stacked on the FeCo alloy layer is a layer made of a material selected from an Fe—Co—Si—B alloy, a Tb-M-Fe alloy showing λs>100 ppm (where M is Sm, Eu, Gd, Dy, Ho, or Er), a Tb-M1-Fe-M2 alloy (where M1 is Sm, Eu, Gd, Dy, Ho, or Er, and where M2 is Ti, Cr, Mn, Co, Cu, Nb, M0, W, or Ta), an Fe-M3-M4-B alloy (where M3 is Ti, Cr, Mn, Co, Cu, Nb, Mo, W, or Ta, and M4 is Ce, Pr, Nd, Sm, Tb, Dy, or Er), Ni, Al—Fe, ferrite (such as $Fe_3O_4$, $(FeCo)_3O_4$)), or the like.

For example, in the case where the intermediate layer 30 is a metal, the GMR effect is shown. In the case where the intermediate layer 30 is an insulator, the TMR effect is shown. For example, in the strain sensing device 50, the CPP (Current Perpendicular to Plane)-GMR effect where a current is passed along the stacking direction of the strain resistance change unit 50s, for example, is used.

For the intermediate layer 30, a CCP (Current-Confined-Path) spacer layer can be used in which a metal current path having a width of about 1 nm or more and 5 nm or less (the diameter, for example) penetrates through a part of the insulating layer in the film thickness direction and a plurality of CCP spacer layers are formed. Also in this case, the CCP-CPP-GMR effect is used.

As described above, in the embodiment, the inverse magnetostriction phenomenon in the strain sensing device 50 is used, so that highly sensitive detection is made possible. In the case of using the inverse magnetostrictive effect, at least one of the magnetization directions of the first magnetic layer 10 and the second magnetic layer 20 is changed with respect to strain to be externally applied, for example. A relative angle between the magnetizations of the two magnetic layers is changed depending on strain to be externally applied (the presence or absence of strain and the degree of strain, for example). Since the electrical resistance is varied depending on strain to be externally applied, the strain sensing device 50 functions as a pressure sensor.

Figure 6A:
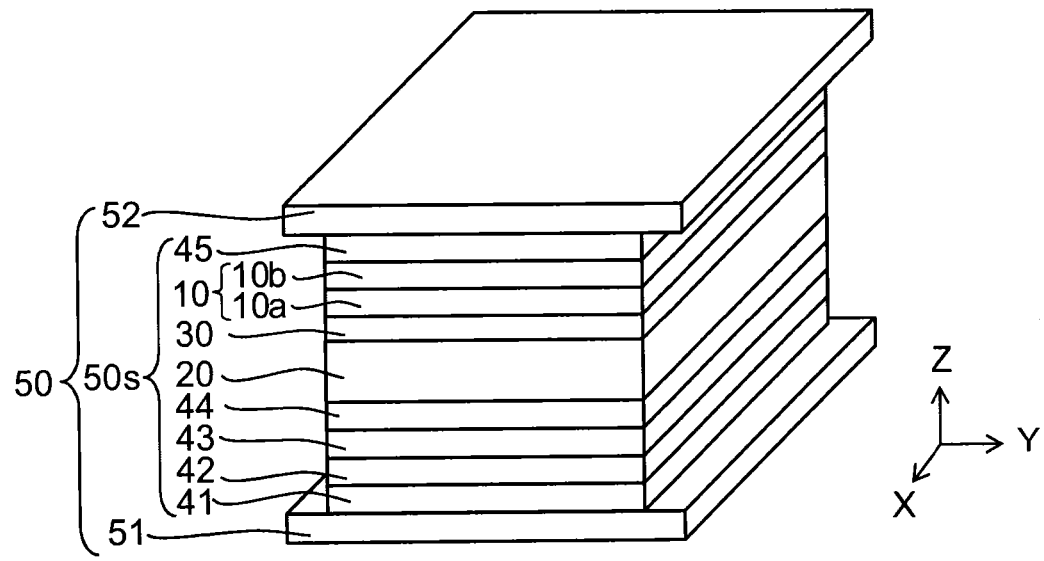
FIG. 6A and FIG. 6B are schematic perspective views illustrating a configuration of a part of the pressure sensor according to the first embodiment.
Figure 6B:
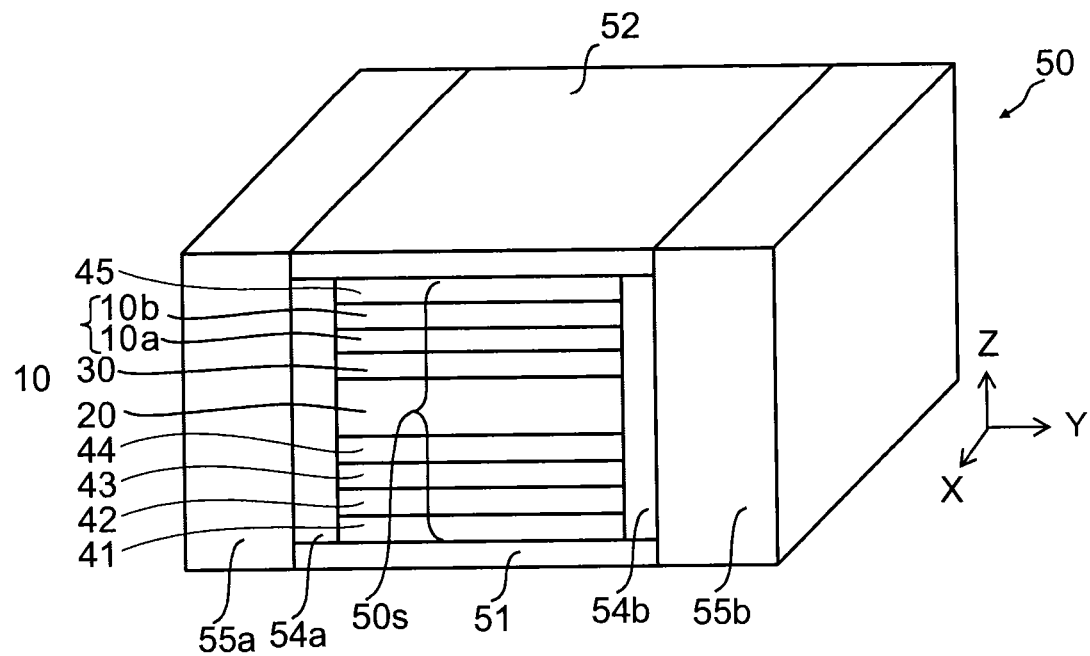

FIG. 6A and FIG. 6B are schematic perspective views illustrating the configuration of a part of the pressure sensor according to the first embodiment.

As shown in FIG. 6A, the strain sensing device 50 includes a first electrode 51 and a second electrode 52, for example. The strain resistance change unit 50s is provided between the first electrode 51 and the second electrode 52. In this example, in the strain resistance change unit 50s, a buffer layer 41, an antiferromagnetic layer 42 (a thickness of 5 nm or more and 10 nm or less, for example), a magnetic layer 43 (a thickness of 2 nm or more and 6 nm or less, for example), an Ru layer 44, the second magnetic layer 20 (a thickness of 2 nm or more and 5 nm or less, for example), the intermediate layer 30 (a thickness of 1 nm or more and 3 nm or less, for example), the first magnetic layer 10 (a thickness of 2 nm or more and 5 nm or less, for example), and a cap layer 45 (a thickness of 1 nm or more and 5 nm or less, for example) are provided in this order from the first electrode 51 side to the second electrode 52. The buffer layer 41 sometimes serves as a seed layer. The thickness of the buffer layer 41 is 1 nm or more and 10 nm or less, for example. More specifically, for the buffer layer 41, an amorphous layer containing Ta, Ti, or the like is used. A layer made of Ru, NiFe, or the like to be a seed layer for promoting crystalline orientation is used. A stacked film of these layers may be used.

A magnetic stacked film is used for the second magnetic layer 20, for example. The first magnetic layer 10 includes a magnetic stacked film 10a to increase the MR change rate (a thickness of 1 nm or more and 3 nm or less, for example, and an alloy containing CoFe, CoFe, or the like is used, for example), and a highly magnetostrictive film 10b (a thickness of 1 nm or more and 5 nm or less, for example) provided between the magnetic stacked film 10a and the cap layer 45.

Au, Cu, Ta, Al, or the like, which are a non-magnetic substance, can be used for the first electrode 51 and the second electrode 52, for example. A soft magnetic material is used for the first electrode 51 and the second electrode 52, and external magnetic noise, which affects the strain resistance change unit 50s, can be reduced. For a soft magnetic material, a permalloy (an NiFe alloy) or silicon steel (FeSi alloy) can be used, for example. The strain sensing device 50 is covered with an insulator such as aluminum oxide ($Al_2O_3$, for example) or silicon oxide ($SiO_2$, for example) to prevent a leakage current from being passed through peripheral portions.

At least one of the magnetization directions of the first magnetic layer 10 and the second magnetic layer 20 is changed according to stress. Preferably, the absolute value of the magnetostriction constant of at least one of the magnetic layers (the magnetic layers that the magnetization direction is changed according to stress) is set to $10^{-5}$ or more, for example. Therefore, the inverse magnetostrictive effect changes the magnetization direction according to external strain. For example, a metal such as Fe, Co, and Ni or an alloy containing Fe, Co, or Ni is used for at least one of the first magnetic layer 10 and the second magnetic layer 20. The value of the magnetostriction constant is set larger depending on an element, an additional element, or the like to be used. Preferably, the absolute value of the magnetostriction constant is larger. In consideration of a material that can be used for a practical device, practically, the absolute value of the magnetostriction constant is about $10^{-2}$ or less.

For example, an oxide such as MgO is used for the intermediate layer 30. The magnetic layer on the MgO layer generally has a positive magnetostriction constant. For example, in the case where the first magnetic layer 10 is formed on the intermediate layer 30, a magnetization free layer in a stacked configuration of CoFeB/CoFe/NiFe is used for the first magnetic layer 10. When the topmost NiFe layer is a Ni-rich layer, the magnetostriction constant of the NiFe layer is negative and the absolute value is increased. In order to suppress the cancellation of a positive magnetostriction on the oxide layer, the Ni composition of the topmost NiFe layer is not made an Ni-rich layer as compared with the permalloy composition of $Ni_{81}Fe_{19}$ generally used. More specifically, preferably, the Ni ratio of the topmost NiFe layer is less than 80 atom percent (atomic percent). In the case where the first magnetic layer 10 is a magnetization free layer, preferably, the thickness of the first magnetic layer 10 is 1 nm or more and 20 nm or less, for example.

In the case where the first magnetic layer 10 is a magnetization free layer, the second magnetic layer 20 may be a magnetization fixed layer or may be a magnetization free layer. In the case where the second magnetic layer 20 is a magnetization fixed layer, the magnetization direction of the second magnetic layer 20 is not substantially changed even though an external strain is applied. The electrical resistance is varied depending on a relative magnetization angle between the first magnetic layer 10 and the second magnetic layer 20. The presence or absence of strain is detected by a difference in the electrical resistance.

In the case where both of the first magnetic layer 10 and the second magnetic layer 20 are magnetization free layers, for example, the magnetostriction constant of the first magnetic layer 10 is set different from the magnetostriction constant of the second magnetic layer 20.

In the case where the second magnetic layer 20 is a magnetization fixed layer and in the case where the second magnetic layer 20 is a magnetization free layer, preferably, the thickness of the second magnetic layer 20 is 1 nm or more and 20 nm or less, for example.

For example, in the case where the second magnetic layer 20 is a magnetization fixed layer, a synthetic AF structure using a stacked structure of a diamagnetic layer/a magnetic layer/an Ru layer/a magnetic layer, or the like can be used for the second magnetic layer 20, for example. IrMn or the like is used for the diamagnetic layer, for example. A hard bias layer may be provided as described later.

The spin of a magnetic layer is used in the strain sensing device 50. A significantly small area is enough for the area necessary for the strain sensing device 50. In the square size, the length of one side of the strain sensing device 50 may be 10 nm×10 nm to 20 nm×20 nm or more, for example.

The area of the strain sensing device 50 is made sufficiently smaller than the area of the transducer thin film 64 deformed by pressure. Here, the transducer thin film is a portion that is surrounded by the fixing end, has the film thickness thinner than the thickness of the fixing end in a certain thickness, and is deformed by an external pressure. More specifically, the area of the strain sensing device 50 is one-fifth of the area of the transducer thin film 64 in the substrate surface or less. Generally, the size of the transducer thin film 64 is about 60 µm or more and 600 µm or less as described above. In the case where the diameter of the transducer thin film 64 is as small as about 60 µm, the length of one side of the strain sensing device 50 is 12 µm or less, for example. When the diameter of the transducer thin film is 600 µm, the length of one side of the strain sensing device 50 is 120 µm or less. This value is the upper limit of the size of the strain sensing device 50, for example.

As compared with the upper limit value, the size that the length of one side is 10 nm or more and 20 nm or less is significantly small, and also in consideration of the processing accuracy of devices, for example, it is unnecessary to excessively make the strain sensing device 50 smaller. For this reason, preferably, the size of one side of the strain sensing device 50 is practically about 0.5 µm or more and 20 µm or less, for example. When the device size is extremely small, the magnitude of a demagnetizing field generated in the strain sensing device 50 becomes large, causing a problem in that the bias control of the strain sensing device 50 becomes difficult, for example. When the device size is large, a diamagnetic field problem does not tend to occur, so that the strain sensing device 50 tends to be easily handled from an engineering viewpoint. From the viewpoint, a length of one side of 0.5 µm or more and 20 µm or less is a preferable size as described above.

For example, the length of the strain sensing device 50 along the X-axis direction is 0.5 µm or more and 20 µm or less.

For example, the length of the strain sensing device 50 along the Y-axis direction (the direction vertical to the X-axis direction and parallel with the X-Y plane) is 0.5 µm or more and 20 µm or less.

Thus, a length of the first strain sensing device 50A along a direction perpendicular to the direction from the first magnetic layer 10 toward the second magnetic layer 20 is 0.5 µm or more and 20 µm or less. A length of the second strain sensing device 50B along a direction perpendicular to the direction from the first magnetic layer 10 toward the second magnetic layer 20 is 0.5 µm or more and 20 µm or less.

For example, the length of the strain sensing device 50 along the Z-axis direction (the direction vertical to the X-Y plane), that is a thickness of the strain sensing device 50, is 20 nm or more and 100 nm or less.

The length of the strain sensing device 50 along the X-axis direction may be the same as the length of the strain sensing device 50 along the Y-axis direction or may be different. When the length of the strain sensing device 50 along the X-axis direction is different from the length of the strain sensing device 50 along the Y-axis direction, shape magnetic anisotropy occurs, so that the effect similar to the effect obtained using a hard bias layer can also be obtained.

The orientation of a current passed in the strain sensing device 50 may be the direction from the first magnetic layer 10 to the second magnetic layer 20, or may be the direction from the second magnetic layer 20 to the first magnetic layer 10.

FIG. 6B illustrates another configuration of a part of the pressure sensor according to the first embodiment.

As shown in FIG. 6B, the strain sensing device 50 may include bias layers 55a and 55b (hard bias layers). The bias layers 55a and 55b are provided as opposing the strain resistance change unit 50s.

In this example, the second magnetic layer 20 is a magnetization fixed layer. The bias layers 55a and 55b are disposed side by side on the second magnetic layer 20. The strain resistance change unit 50s is disposed between the bias layers 55a and 55b. An insulating layer 54a is provided between the bias layer 55a and the strain resistance change unit 50s. An insulating layer 54b is provided between the bias layer 55b and the strain resistance change unit 50s.

The bias layers 55a and 55b apply a bias magnetic field to the first magnetic layer 10, so that the magnetization direction of the first magnetic layer 10 can be biased at an appropriate location, and a single magnetic domain can be formed.

Exemplary sizes of the bias layers 55a and 55b (the length along the Y-axis direction in the example) are 100 nm or more and 10 μm or less, for example.

Exemplary sizes of the insulating layer 54a and 54b (the length along the Y-axis direction in the example) are 1 nm or more and 5 nm or less, for example.

Next, an exemplary operation of the embodiment will be described.

Figure 7A:
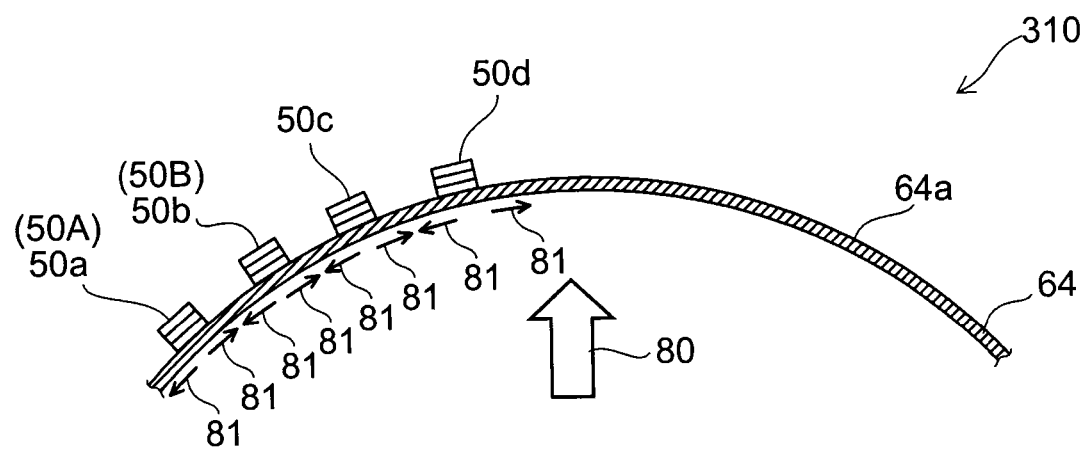
FIG. 7A and FIG. 7B are schematic views illustrating an operation of the pressure sensor according to the first embodiment.
Figure 7B:
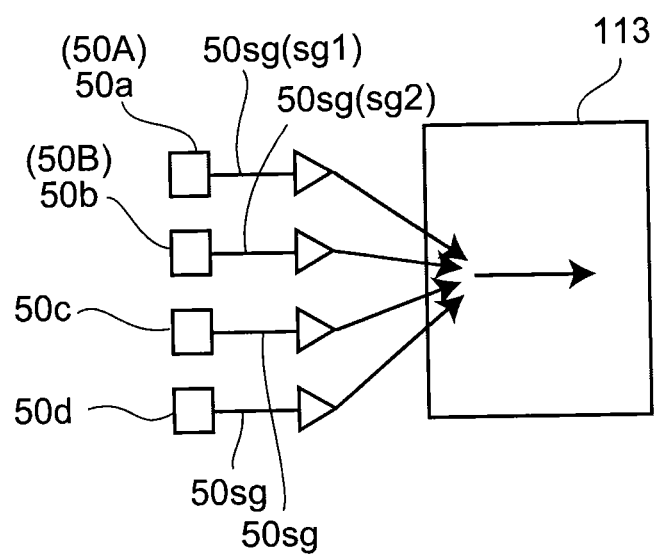

FIG. 7A and FIG. 7B are schematic views illustrating the operation of the pressure sensor according to the first embodiment.

FIG. 7A is a schematic cross-sectional view cut along the straight line 64d in FIG. 2. FIG. 6B is a schematic view illustrating the operation of the pressure sensor.

As shown in FIG. 7A, in the pressure sensor 310 according to the embodiment, stress 80 is applied from a medium such as air to the transducer thin film 64, and the transducer thin film 64 is deformed. For example, the transducer thin film 64 is deformed convexly, and stress 81 (tensile stress in a direction passing the barycenter and the strain sensing devices, for example) is applied to the transducer thin film 64. In applying the stress, the stress 81 is also applied to the strain sensing device 50 provided on the membrane surface 64a of the transducer thin film 64 to generate strain, so that an electrical resistance across one end and the other end of the strain sensing device 50 is varied depending on a change in the strain value by the inverse magnetostrictive effect in the strain sensing device 50. In the case where the transducer thin film 64 is deformed concavely, compressive stress in the direction passing the barycenter and the strain sensing devices is applied to the transducer thin film 64.

As shown in FIG. 7B, a signal 50sg corresponding to the stress can be individually obtained from the strain sensing devices 50. For example, a first signal sg1 can be obtained from the first strain sensing device 50A. A second signal sg2 can be obtained from the second strain sensing device 50B. The signals 50sg are processed at a processing circuit 113. For example, the signals 50sg individually obtained from the strain sensing devices 50 are added.

For example, the processing circuit 113 is configured to perform at least one of an adding process of the first signal sg1 and the second signal sg2, a subtracting process of the first signal sg1 and the second signal sg2, and a multiplying process of the first signal sg1 and the second signal sg2.

In the addition, the signals are simply added as well as the signals are weighted and added according to the locations, for example. Accordingly, a pressure signal preferable for applications can be obtained.

For example, the stress sensor according to the embodiment can be applied to an audio microphone, an ultrasonic microphone, and the like to acquire acoustic waves. In the application, even in the case where signals individually obtained from the strain sensing device 50 are weak, the signals from the strain sensing devices 50 are added to obtain a signal suited for amplification in the subsequent stage.

The signals from the strain sensing devices 50 are processed, and frequency characteristics can also be improved. Multiplication, subtraction, differential signal processing, or the like may be performed as well as addition. Accordingly, a signal more suited for the subsequent amplification can be obtained.

In the embodiment, the size of the strain sensing device 50 can be easily made small, so that a plurality of the strain sensing devices 50 can be easily provided on the transducer thin film 64. The strain sensing devices 50 are disposed on a single common transducer thin film 64, so that the signals obtained from the strain sensing devices 50 complement to each other. For example, the strain sensing devices 50 are disposed at symmetric locations as described later, so that the signals obtained from the strain sensing devices 50 can also have complementary characteristics to each other. In such configurations, the outputs of the strain sensing devices 50 are relatively simply added to easily obtain a signal of desired characteristics without complicated signal processing, for example. Accordingly, acoustic waves can be easily detected highly sensitively in a wide frequency band, for example.

It is difficult to obtain such a detection signal suited for processing using a capacitance variable MEMS microphone, and the configuration according to the embodiment can first achieve the detection.

In the strain sensing device 50 of the pressure sensor 310 according to the embodiment, the inverse magnetostrictive effect and the MR effect are used. Since a change in the resistance caused by a change in magnetization is sensed, the deterioration of sensitivity when the device is downscaled can be suppressed.

On the contrary, for example, in the capacitive pressure sensor, the deterioration of sensitivity is large because the area between electrodes is reduced when downscaling the strain sensing device. Also in the resistive pressure sensor, the deterioration of sensitivity is large because a current of a resistor device is reduced when downscaling the strain sensing device. Therefore, it is difficult to downscale the strain sensing device in the capacitive pressure sensor and the resistive pressure sensor.

In the pressure sensor 310 according to the embodiment, the deterioration of sensitivity is suppressed even though the strain sensing device is downscaled. Namely, a highly sensitive stress sensor can be provided.

In the embodiment, since the deterioration of sensitivity is suppressed even though the strain sensing device is downscaled, a plurality of the strain sensing devices 50 can also be disposed on the transducer thin film 64, for example. Accordingly, the accuracy of measuring pressure can be improved.

For example, the strain sensing devices 50a to 50d are provided on the straight line 64d passing through the barycenter 64b, and the distances from the barycenter 64b are different. The strain values of the strain sensing devices 50a to 50d at the individual locations on the transducer thin films 64 are different from each other. For example, the strain sensing device 50 can respond to the vibrations of the transducer thin film 64 in a wide frequency band by adding the signals 50sg obtained from the strain sensing devices 50a to 50d.

Frequency characteristics can be corrected by processing the signals 50sg obtained from the strain sensing devices 50a to 50d.

As described later, the strain sensing device 50 may be formed above the substrate on which a transistor is formed. Accordingly, the pressure sensor can be downsized, and strain can be highly sensitively detected in a micro-area.

In the case where the transducer thin film 64 is provided above a transistor 112, a movable range actually obtained (a distance along the Z-axis direction) is 10 μm or less. Practically, a smaller movable range can be formed easier. In order to accurately measure strain even in a small movable range, a significantly highly sensitive pressure sensor is necessary. In order to accurately measure a pressure also in a micro point contact, desirably, the area of the transducer thin film is also small. When the transducer thin film becomes small, the deformation value also becomes small unless the film thickness of the transducer thin film is made thin, and it is difficult to highly sensitively measure a pressure. In order to use a pressure sensor in a state in which the pressure sensor does not tend to be broken in an external environment, the film thickness of the transducer thin film is not made so thin, so that the sensitivity of the pressure sensor also deteriorates when the diameter of the transducer thin film is reduced.

As described above, when it is desired to implement two situations that a vertical movable range of the transducer thin film is small and that the strain sensor having a small diameter of the transducer thin film is used, a highly sensitive strain sensor is desired when implementing these two situations. Since the strain sensing device 50 according to the embodiment satisfies these demands, a highly sensitive strain sensor is made possible.

In the strain sensing device 50 according to the embodiment, a high strain sensitivity GF (Gauge Factor) can be implemented even in a small device area without substantially depending on the device size. The strain sensitivity GF can be expressed by GF=($\Delta$R/Rmin)/$\epsilon$, for example, where Rmin is a lower resistance, $\Delta$R is a resistance variation, and $\epsilon$ is strain and expressed by $\Delta$l/l. Here, l is the initial length, and $\Delta$l is a displacement.

For example, in the case of a piezoelectric resistive strain sensor using Si, the strain sensitivity GF is determined by a material for use, and the strain sensitivity GF is about 130, for example. In the case of a piezoelectric resistive strain sensor using Si, a device area having one side of about 100 μm is necessary. The strain sensitivity GF per unit area is 130/100 μm$^2$, for example, which is about $10^{10}$.

On the other hand, in the case of the strain sensing device 50 according to the embodiment (a spin strain sensor), the strain sensitivity GF has no upper limit, and a strain sensing device having a sensitivity GF of about 1,000 can be easily implemented. The device area necessary to implement this strain sensitivity GF is the area of one side of about 20 nm, so that the strain sensitivity GF per unit area is about $10^{17}$, for example. As described above, in the embodiment, as compared with a pressure sensor in a conventional Si-MEMS (Micro Electro Mechanical Systems) structure using Si, the sensitivity per unit area can be improved by about seven digits.

Second Embodiment

Figure 8:
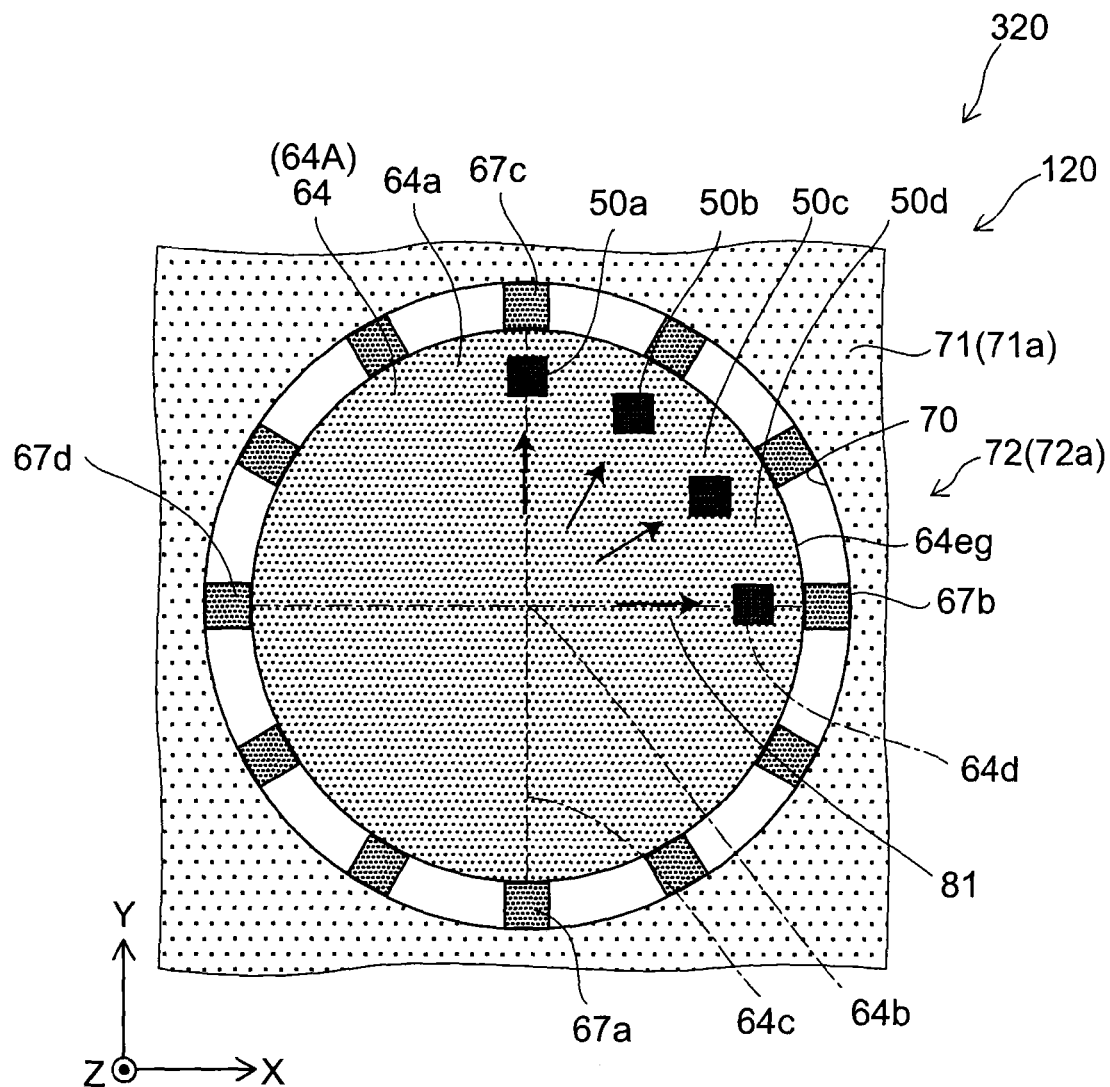
FIG. 8 is a schematic plan view illustrating a configuration of a pressure sensor according to a second embodiment.

FIG. 8 is a schematic plan view illustrating the configuration of a pressure sensor according to a second embodiment.

As shown in FIG. 8, also in a pressure sensor 320 according to the embodiment, a sensor unit 72 (a first sensor unit 72A) is provided. The sensor unit 72 is provided on a base 71a (omitted in FIG. 8). Also in this example, the sensor unit 72 includes a first transducer thin film 64A, a first fixing unit 67A, and a first strain sensing device 50A. Also in this example, a plurality of strain sensing devices 50 (strain sensing devices 50a to 50d) are provided.

In the embodiment, the disposition of the strain sensing devices 50a to 50d is different from the disposition in the first embodiment. The other configurations are similar to the configurations of the first embodiment, and the description is omitted.

In FIG. 8, a first interconnection 57 and a second interconnection 58 connected to the individual strain sensing devices 50 are provided, which are omitted for easily seeing the drawing. Also in this case, these interconnections pass through on the fixing unit 67 or in the fixing unit 67, and extend from the strain sensing device 50 to the base 71a. Although the first interconnection 57 and the second interconnection 58 are provided also in various pressure sensors according to the embodiment described below, the interconnections are omitted in the drawing.

In the embodiment, the strain sensing devices 50a to 50d are disposed along an edge portion 64eg of a transducer thin film 64.

In the pressure sensor 320, the strain sensing devices 50 are disposed at locations in equal distances from the location of a barycenter 64b of the transducer thin film 64, so that the magnitudes of strain in the strain sensing devices 50 caused by the deformation of the transducer thin film 64 are made equal. However, in the embodiment, even though the strain sensing devices 50 are disposed at locations in equal distances from the barycenter 64b, the directions of changing magnetization are different at the individual locations. Therefore, phase responses in the individual strain sensing devices 50 are different from each other, and as a result, obtained signals are different from each other. Accordingly, the effect unique to the embodiment can be exerted by adding the signals from the strain sensing devices 50 showing phase responses different from each other.

In the pressure sensor 320, the first sensor unit 72A further includes a second strain sensing device 50B provided on a membrane surface 64a (a first membrane surface). Also in this case, the second strain sensing device 50B includes a third magnetic layer 10B, a fourth magnetic layer 20B, and a second intermediate layer 30B provided between the third magnetic layer 10B and the fourth magnetic layer 20B, and the second intermediate layer 30B is nonmagnetic. The second strain sensing device 50B and the first strain sensing device 50A are arranged along the edge portion 64eg of the membrane surface 64a. A distance between the first strain sensing device 50A and the barycenter 64b is the same as a distance between the second strain sensing device 50B and the barycenter 64b. Here, the distance between the first strain sensing device 50A and the barycenter 64b is a distance between the barycenter of the first strain sensing device 50A and the barycenter 64b of the membrane surface 64a. The distance between the second strain sensing device 50B and the barycenter 64b is a distance between the barycenter of the second strain sensing device 50B and the barycenter 64b of the membrane surface 64a.

For example, the magnetization direction of the third magnetic layer 10B of the second strain sensing device 50B is along one of the magnetization direction of the first magnetic layer 10 and the magnetization direction of the second magnetic layer 20 of the first strain sensing device 50A, and the magnetization direction of the fourth magnetic layer 20B of the second strain sensing device 50B is along the other of the magnetization direction of the first magnetic layer 10 and the magnetization direction of the second magnetic layer 20 of the first strain sensing device 50A.

In this example, the strain sensing devices 50a to 50d are disposed along the edge portion 64eg on the membrane surface 64a surrounded by a portion on the +X-direction side of the barycenter 64 and a portion on the +Y direction side of the barycenter 64b. The magnetization directions of the first magnetic layer 10 and the second magnetic layer 20 in the strain sensing devices 50a to 50d are a common single direction. For example, the magnetization direction of the first magnetic layer 10 and the magnetization direction of the second magnetic layer 20 are the +X-direction.

Fixing units 67a and 67c are disposed at the intersection points of the straight line 64c and the edge portion 64eg of the transducer thin film 64. Fixing unit 67b and fixing unit 67d are disposed at the intersection points of the straight line 64d and the edge portion 64eg of the transducer thin film 64. The fixing units fix portions located on straight lines passing through the first strain sensing device 72A and the second strain sensing device 72B to the base 71a in the edge portion 64eg of the transducer thin film 64.

In this example, the number of the fixing units 67 is the same as the number of the strain sensing devices 50. The first interconnection 57 and the second interconnection 58 connected to the strain sensing device 50 pass through on or in the fixing units 67 corresponding to the strain sensing devices 50, and extend to the base 71a.

In the pressure sensor 320, an angle between the magnetization directions of the first magnetic layer 10 and the second magnetic layer 20 in the strain sensing device 50a and the direction of the stress 81 is different from an angle between the magnetization directions of the first magnetic layer 10 and the second magnetic layer 20 in the strain sensing device 50b and the direction of the stress 81.

Figure 9:
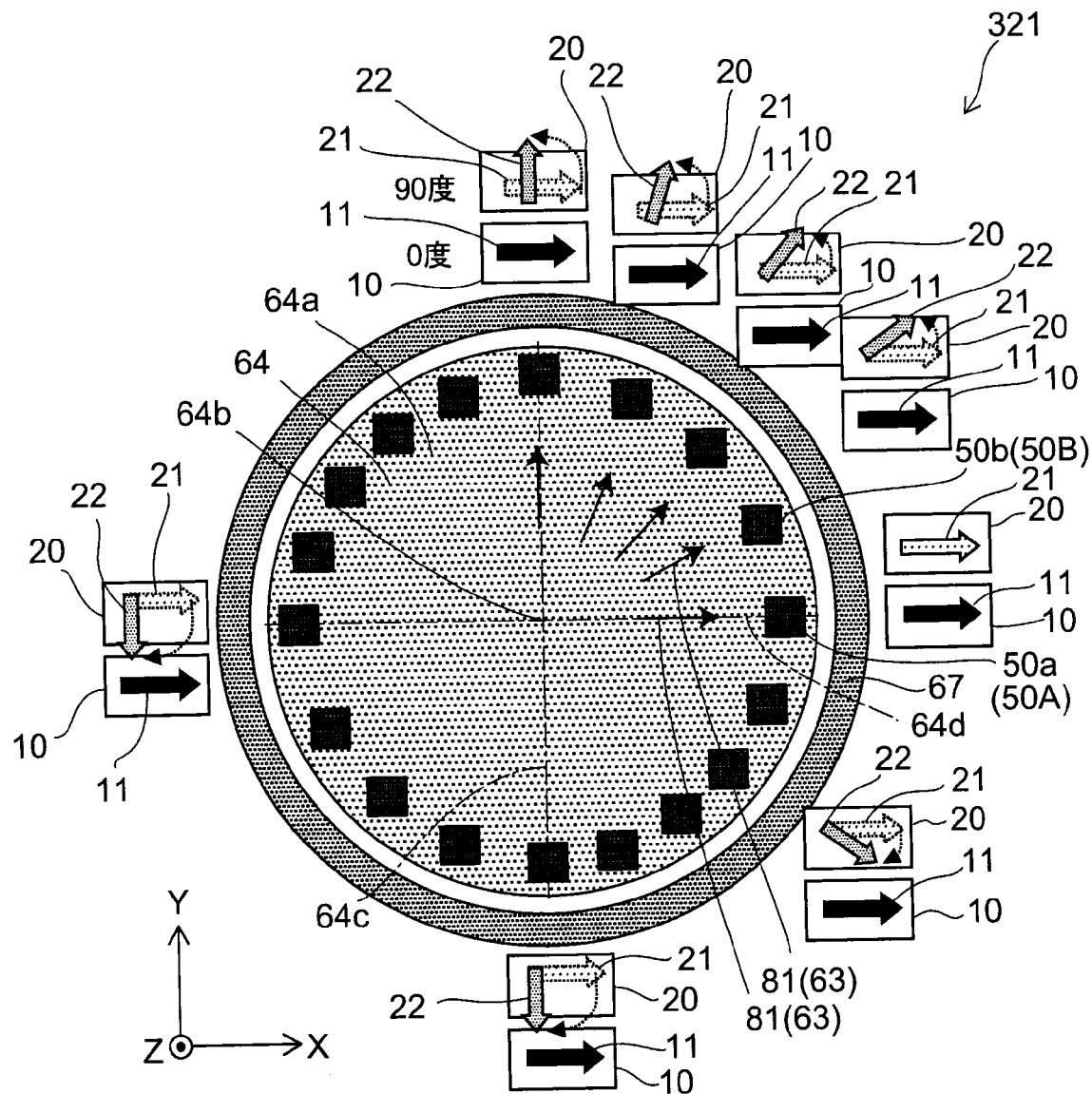
FIG. 9 is a schematic plan view illustrating a configuration of another pressure sensor according to the second embodiment.

FIG. 9 is a schematic plan view illustrating the configuration of another pressure sensor according to the second embodiment. As shown in FIG. 9, also in a pressure sensor 321, a plurality of strain sensing devices 50 are disposed along an edge portion 64eg of a transducer thin film 64. In this example, distances from a barycenter 64b to the strain sensing devices 50 are substantially equal. For example, a magnetization direction 11 of a first magnetic layer 10 and a magnetization direction 21 of a second magnetic layer 20 in strain sensing devices 50a to 50d when no stress 81 is applied to the transducer thin film 64 are directed to the common direction. For example, the magnetization direction 11 of the first magnetic layer 10 and the magnetization direction 21 of the second magnetic layer 20 are the +X-direction. In this example, the shape of a fixing unit 67 is a ring shape. The fixing unit 67 fixes the transducer thin film 64 along the edge portion 64eg of the transducer thin film 64, and continuously fixes the edge portion 64eg of the transducer thin film 64.

The deformation value of the transducer thin film 64 depends on a distance from the barycenter 64b. In the transducer thin film 64, stress 81 is applied to directions different from each other (stress directions 63) along the edge portion 64eg of the transducer thin film 64.

The strain sensing device 50a is disposed on the +X direction side from the barycenter 64b. The magnetization direction 21 of the second magnetic layer 20 in the strain sensing device 50a is the same as the direction 63 of the stress 81. In the strain sensing device 50a, a magnetization direction 22 of the second magnetic layer is not changed when the stress 81 is applied, and remains in the initial magnetization direction 21. In this case, an angle between the magnetization direction 11 of the first magnetic layer 10 and the magnetization direction 22 (the magnetization direction 21) of the second magnetic layer 20 in the strain sensing device 50a is an angle of zero degree.

The strain sensing device 50b is disposed at a location rotated about the center of the barycenter 64b at an angle θ (an angle of 22.5 degrees, for example) from the X-axis direction based on the strain sensing device 50a, for example. An angle between the magnetization direction 21 of the second magnetic layer 20 in the strain sensing device 50b and the direction 63 of the stress 81 is an angle θ, for example. In this case, the magnetization direction 22 of the second magnetic layer 20 when stress is applied is rotated at an angle θ from the initial magnetization direction 21 to be the magnetization direction 22. An angle between the magnetization direction 11 of the first magnetic layer 10 and the magnetization direction 22 of the second magnetic layer 20 in the strain sensing device 50b is an angle θ, for example.

Similarly, an angle between the magnetization direction 11 of the first magnetic layer 10 and the magnetization direction 22 of the second magnetic layer 20 when stress is applied in the strain sensing devices 50 disposed along the edge portion 64eg of the transducer thin film 64 is changed depending on the direction 63 of the stress 81. The phases of signals 50sg obtained from the strain sensing devices 50 are different from each other. The signals 50sg are changed depending on an angle between the magnetization direction 11 of the first magnetic layer 10 and the magnetization direction 22 of the second magnetic layer 20.

For example, as described with reference to FIG. 7B, the signals 50sg (such as a first signal sg1 and a second signal sg2) obtained from the strain sensing devices 50a to 50d are added using a processing circuit 113, for example.

Also in this example, addition may be performed as weighted at locations, for example. Accordingly, a pressure signal preferable for applications can be obtained.

For example, even in the case where signals individually obtained from the strain sensing device 50 are weak, the signals from the strain sensing devices 50 are added to obtain a signal suited for amplification in the subsequent stage.

The frequency characteristics can also be improved. Multiplication, subtraction, differential signal processing, or the like may be performed as well as addition. Accordingly, a more suited signal can be obtained for the subsequent amplification.

In the embodiment, the strain sensing devices 50 are provided on a common single transducer thin film 64, and a signal of desired characteristics can be easily obtained without complicated signal processing, for example. Accordingly, acoustic waves can be easily detected highly sensitively in a wide frequency band, for example.

According to the pressure sensors 320 and 321, phase differences between the strain sensing devices 50 are used to perform filter processing. Accordingly, the controllability of frequency characteristics can be enhanced.

Since the shape and structure of the transducer thin film are directly related to the frequency responsiveness, the structure of the transducer thin film is sometimes very complicated when it is desired to obtain a high sensitivity in a wide frequency band in general.

On the contrary, in the pressure sensors 320 and 321 according to the embodiment, a transducer thin film in a simple structure is used to improve frequency characteristics in a wide band without complicating the shape of the transducer thin film.

In the embodiment, this is a unique effect obtained from the facts that the strain sensing devices 50 can be provided on a single transducer thin film 64 because of a high sensitivity of the strain sensing device 50 per area, and that a degree of freedom of the disposition of the strain sensing devices 50 is high.

Third Embodiment

Figure 10:
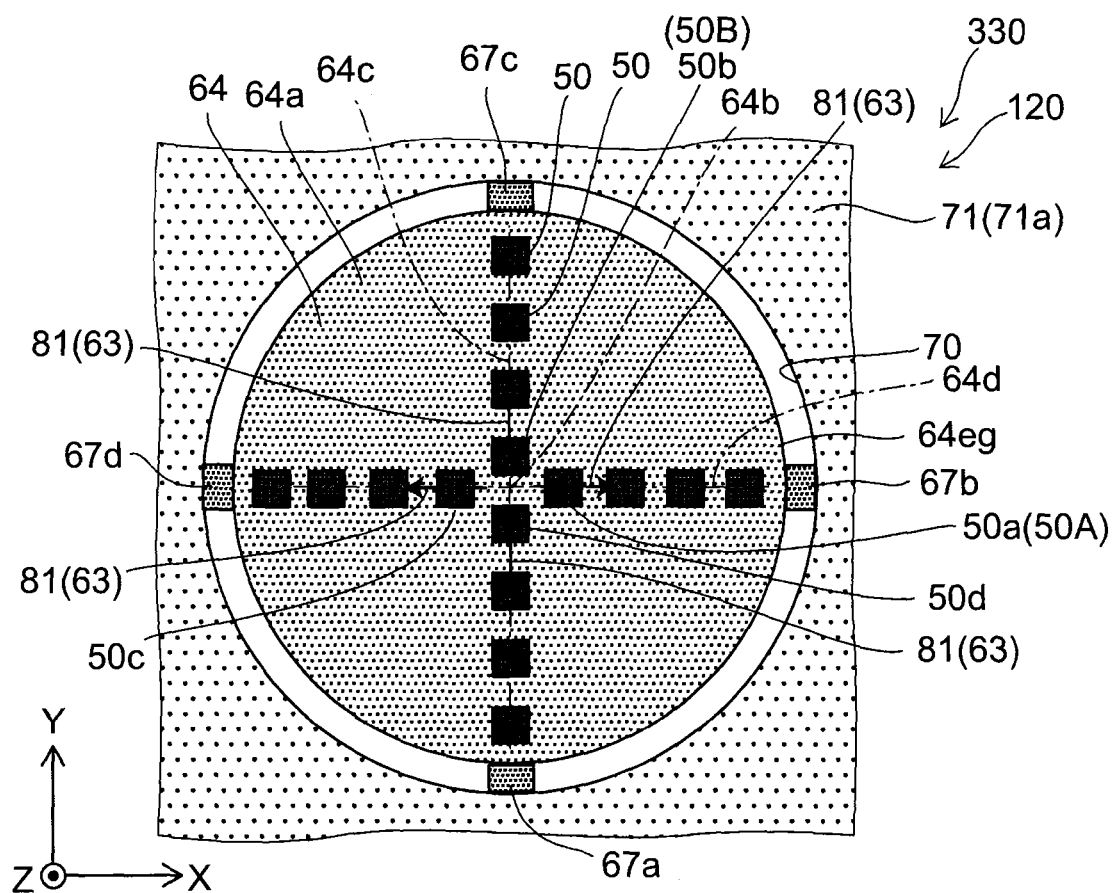
FIG. 10 is a schematic plan view illustrating a configuration of a pressure sensor according to a third embodiment.

FIG. 10 is a schematic plan view illustrating the configuration of a pressure sensor according to a third embodiment. As shown in FIG. 10, in a pressure sensor 330, a plurality of strain sensing devices 50 are disposed at substantially equal distances along a straight line 64c and a straight line 64d. For example, four strain sensing devices 50 are disposed on both sides of the center (corresponding to a barycenter 64b) of the straight line 64c. Four strain sensing devices 50 are disposed on both sides of the center (corresponding to the barycenter 64b) of the straight line 64d. In this example, the strain sensing devices 50 are disposed at substantially symmetric locations to the barycenter 64b.

Namely, also in the pressure sensor 330 according to the embodiment, the strain sensing devices 50 are provided. For example, a sensor unit 72 (a first sensor unit 72A) further includes a second strain sensing device 50B in addition to a first strain sensing device 50A.

For example, suppose that the first strain sensing device 50A is a strain sensing device 50a, and the second strain sensing device 50B is a strain sensing device 50b. The second strain sensing device 50B and the first strain sensing device 50A are arranged along an edge portion 64eg of a membrane surface 64a.

For example, suppose that the first strain sensing device 50A is the strain sensing device 50a, and the second strain sensing device 50B is a strain sensing device 50c. A straight line (the straight line 64d) connecting the first strain sensing device 50A (the strain sensing device 50a) to the second strain sensing device 50B (the strain sensing device 50c) passes through the barycenter 64b. In other words, the first strain sensing device 50A (the strain sensing device 50a), the second strain sensing device 50B (the strain sensing device 50c), and the barycenter 64b are in the straight line (the straight line 64d).

On the contrary, in the pressure sensor 330 according to the embodiment, a plurality of strain sensing devices that differently react on strain are provided. Accordingly, frequency characteristics can be corrected.

For example, in the strain sensing devices 50a to 50d at locations symmetric to the barycenter 64b of the transducer thin film 64, the magnetization directions of the first magnetic layer 10 and the second magnetic layer 20 of the strain sensing devices 50a to 50d before applying stress are the X-axis direction, for example. When stress is applied to the transducer thin film 64, stress 81 (tensile stress, for example) occurs in the direction from the barycenter 64b of the membrane surface 64a of the transducer thin film 64 to the edge portion 64eg. An angle between the magnetization direction and the direction 63 of the stress 81 is different among the strain sensing devices 50a to 50d. For example, in this example, angles between the magnetization directions of the strain sensing devices 50a to 50d and the direction 63 of the stress 81 are angles of zero degree, 90 degrees, 180 degrees, and 90 degrees, respectively. The signals of the angles are added at a processing circuit. Accordingly, frequency characteristics in a wide band can be obtained.

In the pressure sensor 330, fixing units 67a and 67c are disposed at the intersection points of the straight line 64c and the edge portion 64eg of the transducer thin film 64. Fixing unit 67b and fixing unit 67d are disposed at the intersection points of the straight line 64d and the edge portion 64eg of the transducer thin film 64.

Figure 11:
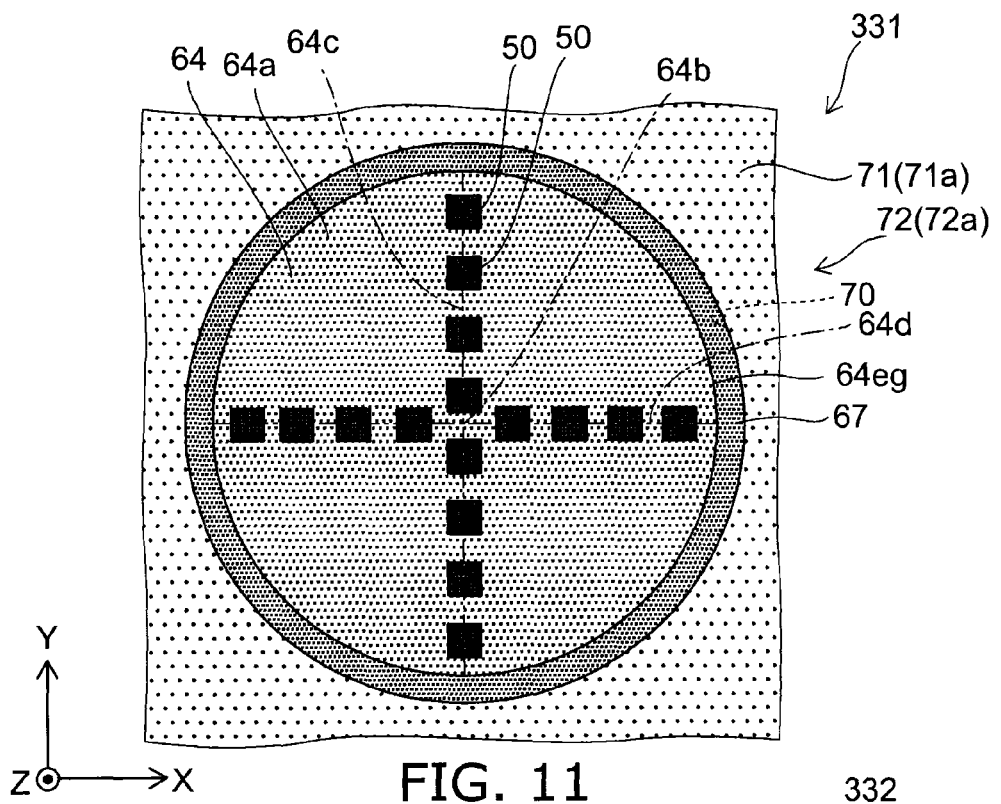
FIG. 11 is a schematic plan view illustrating a configuration of another pressure sensor according to the third embodiment.

FIG. 11 is a schematic plan view illustrating the configuration of another pressure sensor according to the third embodiment. As shown in FIG. 11, in a pressure sensor 331 according to the embodiment, the shape of a fixing unit 67 is a ring shape. The fixing unit 67 is provided along an edge portion 64eg of a transducer thin film 64. The fixing unit 67 continuously fixes the edge portion 64eg of the transducer thin film 64. Since the fixing unit 67 continuously fixes the edge portion 64eg of the transducer thin film 64, the deformation value of the transducer thin film 64 can depend on a distance from a barycenter 64b.

Figure 12:
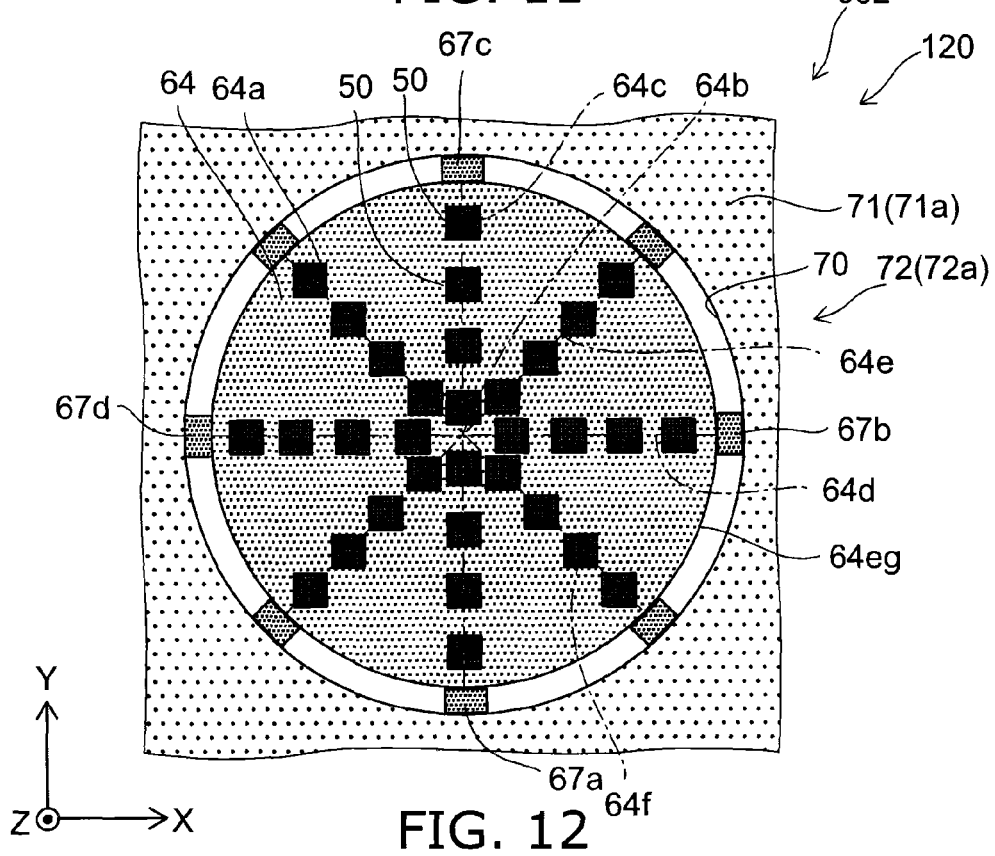
FIG. 12 is a schematic plan view illustrating a configuration of still another pressure sensor according to the third embodiment.

FIG. 12 is a schematic plan view illustrating the configuration of still another pressure sensor according to the third embodiment. As shown in FIG. 12, in a pressure sensor 332 according to the embodiment, a plurality of strain sensing devices 50 are disposed at substantially equal distances along a straight line 64c and a straight line 64d. Four strain sensing devices 50 are disposed on both sides of a barycenter 64b of the straight line 64c, and four strain sensing devices 50 are disposed on both sides of the barycenter 64b of the straight line 64d.

The strain sensing devices 50 are disposed at substantially equal distances along a straight line 64e and a straight line 64f. Four strain sensing devices 50 are disposed on both sides of the center (corresponding to the barycenter 64b) of the straight line 64e, and four strain sensing devices 50 are disposed on both sides of the center (corresponding to the barycenter 64b) of the straight line 64f. The strain sensing devices 50 are disposed at symmetric locations to the barycenter 64b.

Fourth Embodiment

Figure 13:
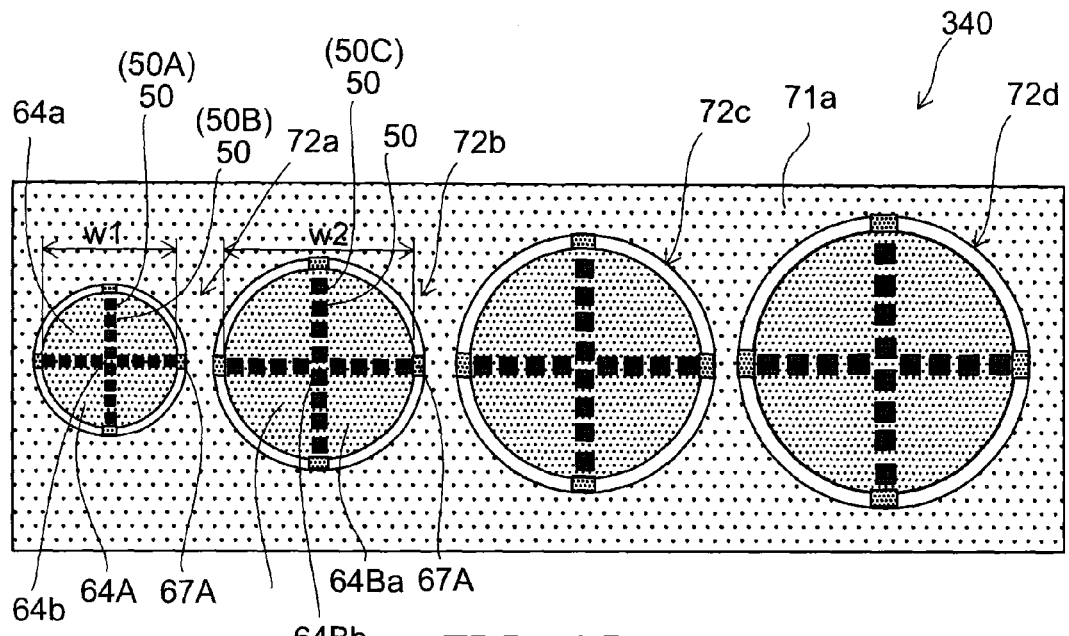
FIG. 13 is a schematic plan view illustrating a configuration of a pressure sensor according to a fourth embodiment.

FIG. 13 is a schematic plan view illustrating the configuration of a pressure sensor according to a fourth embodiment.

As shown in FIG. 13, a pressure sensor 340 includes a plurality of sensor units 72. For example, the pressure sensor 340 further includes a second sensor unit 72B in addition to a base 71a and a first sensor unit 72A.

As already explained, the first sensor unit 72A includes a first transducer thin film 64A, a first fixing unit 67A, and a first strain sensing device 50A. In this example, the first sensor unit 72A further includes a second strain sensing device 50B. The configurations of these components are as recited above.

The second sensor unit 72B is provided on the base 71a. The second sensor unit 72B further includes a second transducer thin film 64B, a second fixing unit 67B, and a third strain sensing device 50C. The second transducer thin film 64B has a second membrane surface 64Ba, and is visible. The second fixing unit 67B fixes the second transducer thin film 64B to the base 71a. The third strain sensing device 50C is provided on the second membrane surface 64Ba.

The configuration of the third strain sensing device 50C is similar to the configuration of the first strain sensing device 50A, for example. Namely, as illustrated in FIG. 3, the third strain sensing device 50C includes a fifth magnetic layer 10C, a sixth magnetic layer 20C, and a third intermediate layer 30C provided between the fifth magnetic layer 10C and the sixth magnetic layer 20C. The third intermediate layer 30C is non-magnetic.

A width w2 of the second transducer thin film 64B passing through a barycenter 64Bb of the second membrane surface 64Ba of the second transducer thin film 64B along a direction parallel with the second membrane surface 64Ba is different from a width w1 of the first transducer thin film 64A passing through the barycenter 64b of the membrane surface 64a (a first membrane surface) of the first transducer thin film (the transducer thin film 64) 64A along a direction parallel with the first membrane surface. In this example, the width w2 is wider than the width w1.

As described above, in the pressure sensor 340, a plurality of the transducer thin films 64 having different diameters are disposed in an array configuration. When the diameters are different, frequencies to resonate are different. Accordingly, sensitivity can be improved in a plurality of resonance frequencies.

Fifth Embodiment

This embodiment relates to a method for manufacturing a pressure sensor (for example, the pressure sensors according to the first to the fourth embodiments).

Figure 14:
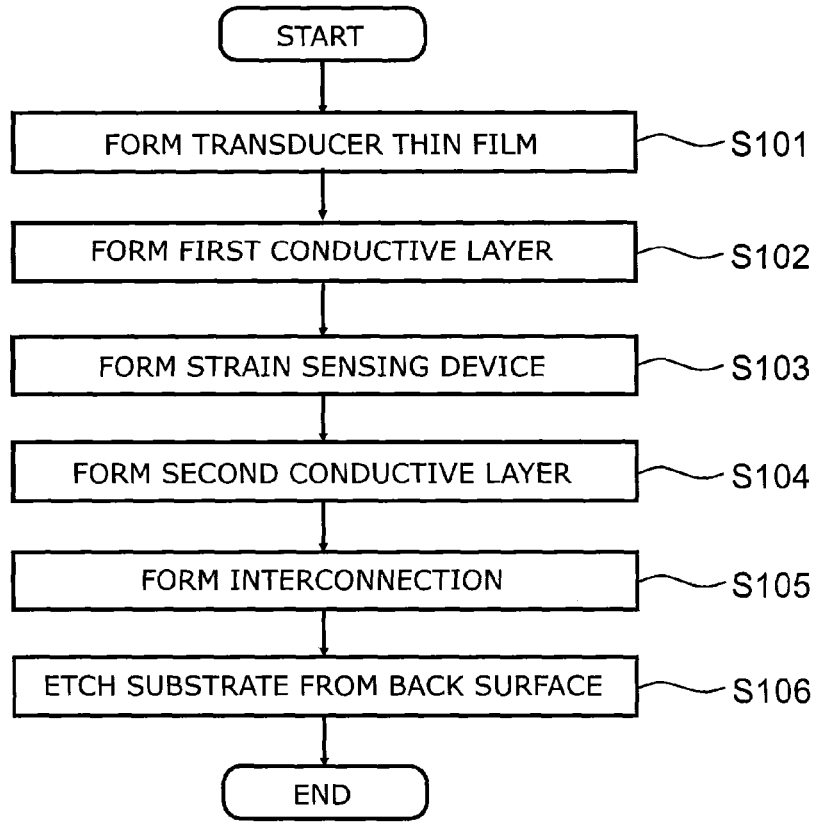
FIG. 14 is a flowchart illustrating a method for manufacturing a pressure sensor according to a fifth embodiment.

FIG. 14 is a flowchart illustrating a method for manufacturing a pressure sensor according to a fifth embodiment.

FIG. 15A to FIG. 15D are schematic perspective views illustrating the process steps of the method for manufacturing the pressure sensor according to the fifth embodiment.

These drawings are an exemplary method for manufacturing the pressure sensor 310. In FIG. 14A to FIG. 14D, the shape and size of the components are appropriately modified from FIG. 1 for easily seeing the drawing.

As shown in FIG. 14, the transducer film is formed (Step S101).

Figure 15A:
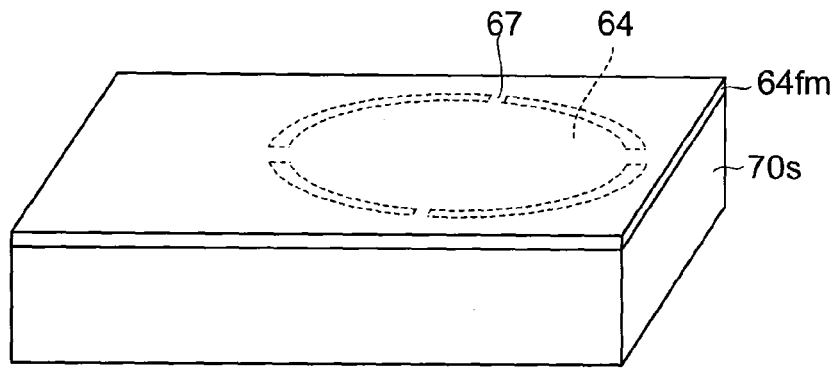
FIG. 15A to FIG. 15D are schematic perspective views illustrating process steps of the method for manufacturing the pressure sensor according to the fifth embodiment.

For example, as shown in FIG. 15A, a transducer film 64fm to be the transducer thin film 64 is formed on a substrate 70s. A silicon substrate is used for the substrate 70s, for example. A silicon oxide film is used for the transducer film 64fm, for example. In the case of forming the fixing unit 67 (the fixing units 67a to 67d, for example) to intermittently hold the edge portion 64eg of the transducer thin film 64, the transducer film 64fm may be processed to form portions to be the fixing unit 67 in this process step.

As shown in FIG. 14, the first conductive layer is formed (Step S102).

Figure 15B:
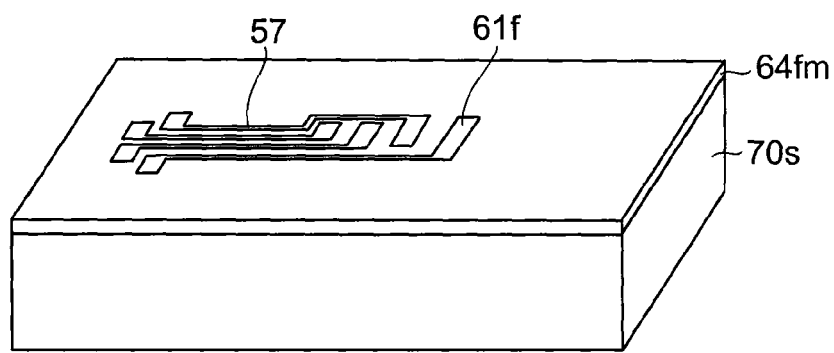

For example, as shown in FIG. 15B, a conductive film is formed on the transducer film 64fm (or on the transducer thin film 64), and this conductive film is processed in a predetermined shape to form the first conductive layer (a conductive layer 61f). This conductive layer can be at least a part of the first interconnection 57, for example.

As shown in FIG. 14, the strain sensing device 50 is formed (Step S103).

Figure 15C:
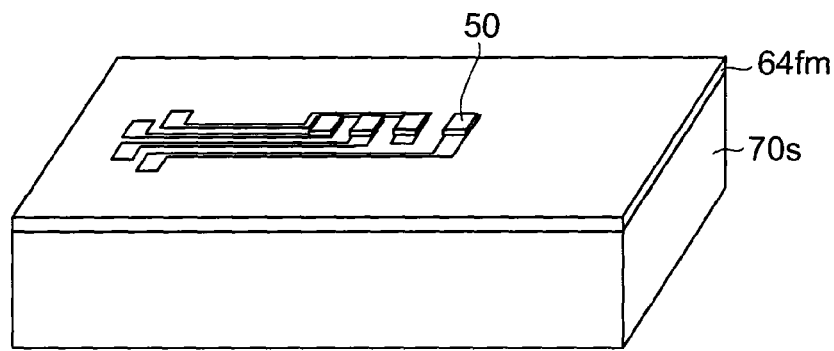

For example, as shown in FIG. 15C, a stacked film to be the strain sensing device 50 is formed on the conductive layer 61f. This stacked film includes a buffer layer, a seed layer, an antiferromagnetic layer, a magnetic layer, a magnetic coupling layer, a magnetic layer, an intermediate layer, a magnetic layer, a high magnetostriction film, a cap film, and so on stacked in this order, for example. The stacked film is processed in a predetermined shape to form the strain sensing device 50 (the strain sensing devices 50a to 50d, for example).

As shown in FIG. 14, the second conductive layer is formed (Step S104).

Figure 15D:
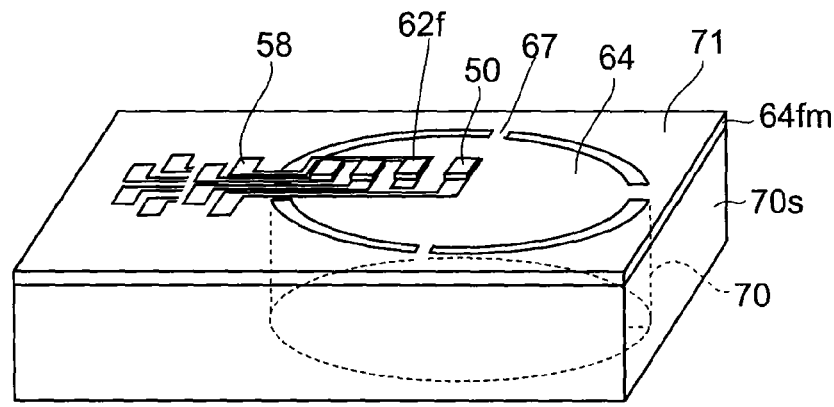

For example, as shown in FIG. 15D, an insulating film, not shown, is formed so as to cover the strain sensing device 50, and a part of this insulating film is removed to expose the top surface of the strain sensing device 50. A conductive film is formed on the exposed top surface, and processed in a predetermined shape, and the second conductive layer (a conductive layer 62f) can be obtained.

As shown in FIG. 14, an interconnection (the first interconnection 57, for example) connected to the first conductive layer and an interconnection (the second interconnection 58, for example) connected to the second conductive layer are formed (Step S105). The interconnections may be formed by at least one of forming the first conductive layer and forming the second conductive layer. Namely, at least a part of the process steps of processing the interconnections may be performed simultaneously as performing at least a part of the process steps of forming the first conductive layer, forming the second conductive layer, and forming the strain sensing device. Namely, at least a part of Steps S102 to S105 may be performed simultaneously or may swap the order within a technically feasible range.

As shown in FIG. 14, the substrate 70s is etched from the back surface (the lower surface) (Step S106). Deep-RIE (Reactive Ion Etching) or the like is used for the processing, for example. The Bosch process may be performed in the processing.

As shown in FIG. 15D, the caving portion 70 is then formed on the substrate 70s by etching. A portion where the caving portion 70 is not formed is the non-cavity portion 71, and the transducer thin film 64 is formed.

In the case of forming the fixing unit 67 to continuously hold the edge portion 64eg of the transducer thin film 64 (in the pressure sensor 321, for example), the substrate 70s is etched from the back surface to simultaneously form the fixing unit 67 with the transducer thin film 64.

As described above, in this manufacturing method, a film (the transducer film 64fm) to be the transducer thin film 64 is formed on the semiconductor substrate, and a film to be the strain sensing device 50 (the strain resistance change unit) is formed on the film for patterning device shapes. According to the embodiment in which the substrate is etched from the back surface to the transducer film 64fm to form the transducer thin film 64 after forming devices and passing a current, a highly sensitive pressure sensor can be manufactured.

Sixth Embodiment

Figure 16:
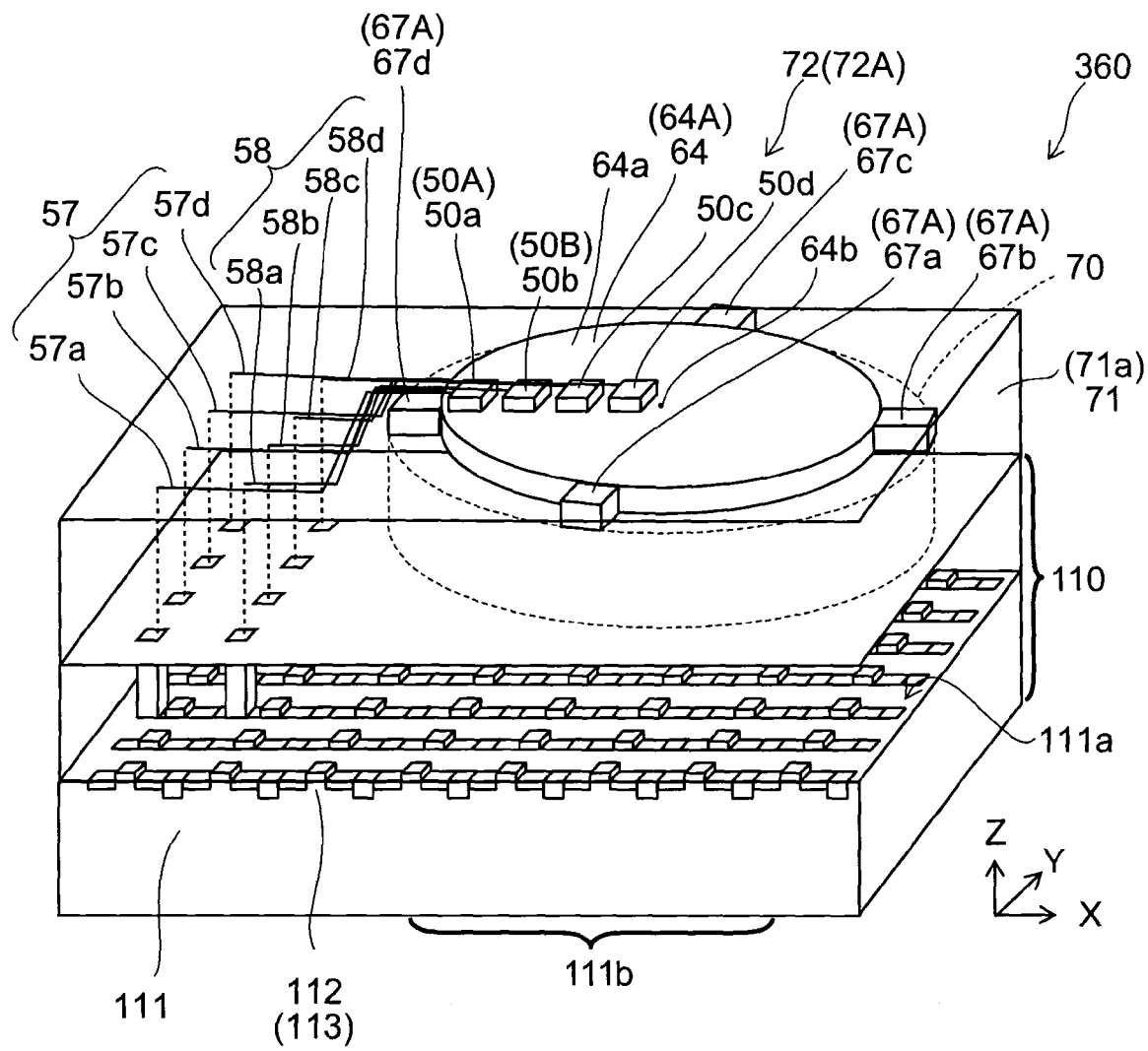
FIG. 16 is a schematic perspective view illustrating a pressure sensor according to a sixth embodiment.

FIG. 16 is a schematic perspective view illustrating a pressure sensor according to a sixth embodiment.

As shown in FIG. 16, a pressure sensor 360 according to the embodiment is provided with a semiconductor circuit unit 110 in addition to a base 71a and a sensor unit 72 (a first sensor unit 72A). The base 71a is provided on the semiconductor circuit unit 110, and the sensor unit 72 is provided on the base 71a.

The semiconductor circuit unit 110 includes a semiconductor substrate 111 and a transistor 112, for example.

The semiconductor substrate 111 includes a major surface 111a of the semiconductor substrate 111. The semiconductor substrate 111 includes an active region 111b provided on the major surface 111a. The transistor 112 is provided in the active region 111b.

The semiconductor circuit unit 110 may include a processing circuit 113. The processing circuit 113 may be provided in the active region 111b, or may be provided in a region other than the active region 111b. The processing circuit 113 is provided at a given location on the semiconductor circuit unit 110. The processing circuit 113 may include the transistor 112 provided in the active region 111b.

The base 71a is provided above the semiconductor circuit unit 110, for example. A caving portion 70 is formed on the base 71a. The caving portion 70 is formed above the transistor 112. The caving portion 70 is formed at least above the active region 111b. Portions other than the caving portion 70 in the base 71a are a non-cavity portion 71. The non-cavity portion 71 is disposed side by side on the caving portion 70 in a plane parallel with the major surface 111a.

In this example, a strain sensing device 50 is formed above the substrate formed with the transistor 112. The transistor 112 is connected to the strain sensing device 50 using interconnections consistently formed in the wafer manufacturing process steps, not using wires used in the mounting process step. Accordingly, the pressure sensor can be downsized, and strain can be highly sensitively detected in a micro-area.

The transistor 112 and the strain sensing device 50 are formed on the common substrate, so that circuits (such as the processing circuit 113) including an arithmetic circuit, an amplifier, and a communication circuit to process information obtained by the sensor can be formed on the substrate where the strain sensing device 50 is formed. A highly sensitive sensor is integrally formed with an arithmetic operation circuit to implement downsizing when seeing the system as a whole. Moreover, low power consumption can be implemented.

In the embodiment, a highly sensitive sensor and a circuit to arithmetically process obtained signals using the sensor are implemented as a system-on-chip on a common substrate, for example.

However, as already explained, the semiconductor circuit unit 110 may be separately provided from the base 71a and the sensor unit 72. In this case, for example, the base 71a, the sensor unit 72, and the semiconductor circuit unit 110 are disposed in a single package in the packaging process step.

Figure 17A:
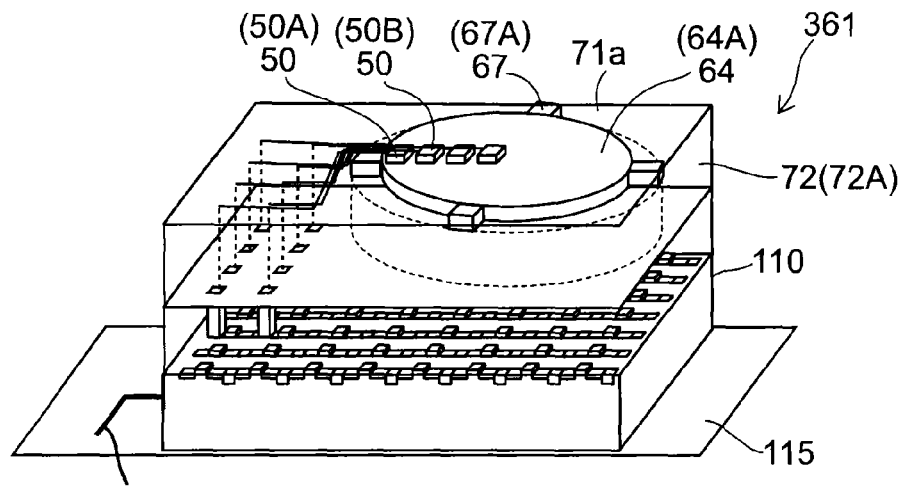
FIG. 17A to FIG. 17C are schematic views illustrating a configuration of the pressure sensor according to the sixth embodiment.
Figure 17B:
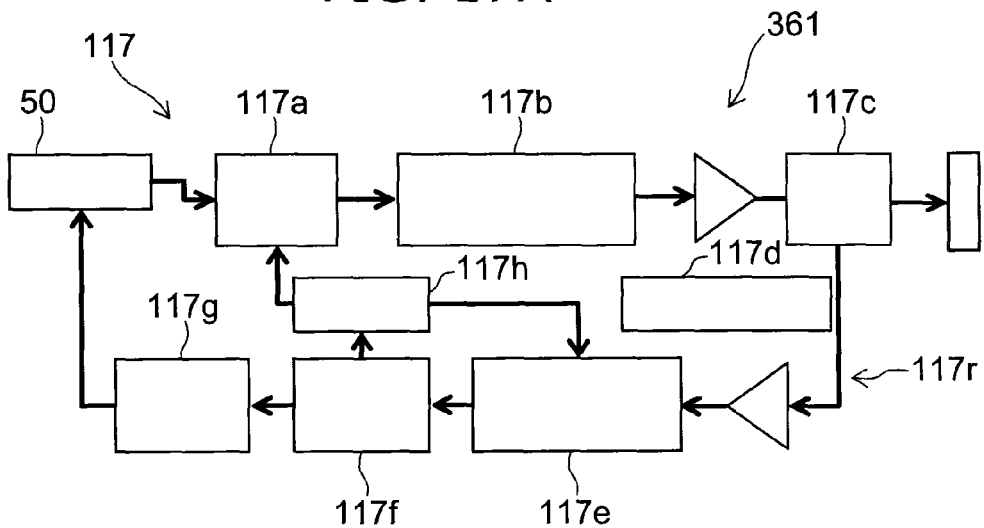
Figure 17C:
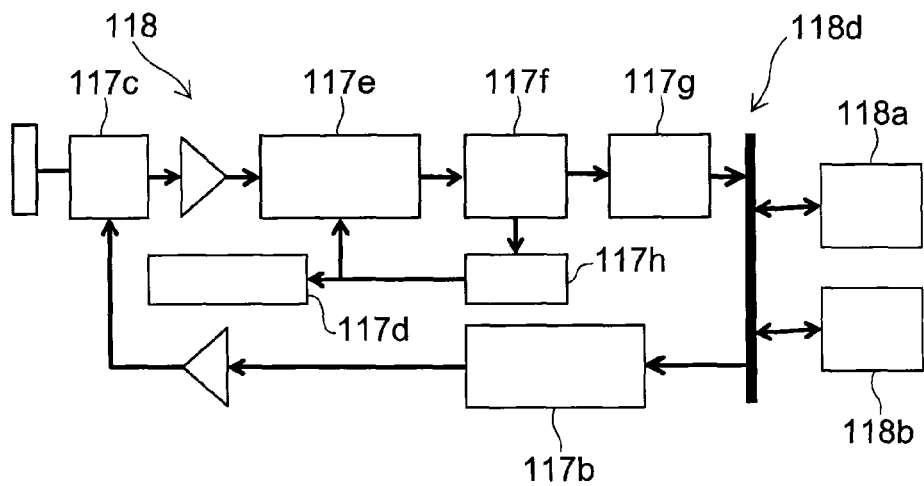

FIG. 17A to FIG. 17C are schematic views illustrating the configuration of the pressure sensor according to the sixth embodiment.

FIG. 17A is a schematic perspective view, and FIG. 17B and FIG. 17C are block diagrams illustrating the pressure sensor.

As shown in FIG. 17A, a pressure sensor 361 according to the embodiment further includes an antenna 115 and an electrical interconnect 116 in addition to the base 71a, the sensor unit 72, and the semiconductor circuit unit 110. The antenna 115 is connected to the semiconductor circuit unit 110 through the electrical interconnect 116. The sensor unit 72 of the pressure sensor 361 has the configuration similar to the sensor unit 72 of the pressure sensor 310 illustrated in FIG. 1 and FIG. 2, for example. Namely, for example, the base 71a and the first sensor unit 72A are provided. The first sensor unit 72A includes a first transducer thin film 64A, a first fixing unit 67A, and a first strain sensing device 50A. In this example, the first sensor unit 72A further includes a second strain sensing device 50B. The configurations of these components are the same as recited above.

As shown in FIG. 17B, a transmitting circuit 117 is provided on the pressure sensor 361. The transmitting circuit 117 sends data based on electrical signals passed through the strain sensing device 50 in a wireless manner. At least a part of the transmitting circuit 117 can be provided on the semiconductor circuit unit 110. The semiconductor circuit unit 110 can include the transmitting circuit 117 that sends data based on electrical signals passed through the strain sensing device 50 in a wireless manner.

As shown in FIG. 17C, a receiving unit 118 is provided on an electronic device 118d used in combination of the pressure sensor 361. An electronic device such as a portable terminal is used for the electronic device 118d, for example.

For example, the pressure sensor 361 including the transmitting circuit 117 is combined with the electronic device 118d including the receiving unit 118 for use to provide more convenience.

In this example, as shown in FIG. 17B, the pressure sensor 361 is provided with a receiving circuit 117r that receives a control signal from the electronic device 118d. For example, at least a part of the receiving circuit 117r can be formed on the semiconductor circuit unit 110. The receiving circuit 117r is provided to control the operation of the pressure sensor 361 by manipulating the electronic device 118d, for example.

As shown in FIG. 17B, in this example, the pressure sensor 361 is provided with an analog-to-digital converter 117a connected to the strain sensing device 50 and a Manchester encoding unit 117b for the transmitting circuit 117, for example. A switching unit 117c is further provided to switch between transmission and reception. A timing controller 117d controls the switching between transmission and reception. A data correcting unit 117e, a synchronizing unit 117f, and a judging unit 117g are provided for the receiving circuit 117r. A voltage controlled oscillator (VCO) 117h is further provided.

On the other hand, as shown in FIG. 17C, the electronic device 118d is provided with a Manchester encoding unit 117b, a switching unit 117c, a timing controller 117d, a data correcting unit 117e, a synchronizing unit 117f, a judging unit 117g, and a voltage controlled oscillator 117h, and further provided with a storage unit 118a and a central processing unit 118b (a CPU).

Seventh Embodiment

This embodiment relates to a method for manufacturing a pressure sensor according to an embodiment. In the following, a method for manufacturing the pressure sensor 360 will be described for an example.

FIG. 18A, FIG. 18B, FIG. 19A, FIG. 19B, FIG. 20A, FIG. 20B, FIG. 21A, FIG. 21B, FIG. 22A, FIG. 22B, FIG. 23A, FIG. 23B, FIG. 24A, FIG. 24B, FIG. 25A, FIG. 25B, FIG. 26A, FIG. 26B, FIG. 27A, FIG. 27B, FIG. 28A, FIG. 28B, FIG. 29A, and FIG. 29B are schematic views illustrating a method for manufacturing a pressure sensor according to a seventh embodiment.

FIG. 18A to FIG. 29A are schematic plan views, and FIG. 18B to FIG. 29B are schematic cross-sectional views.

Figure 18A:
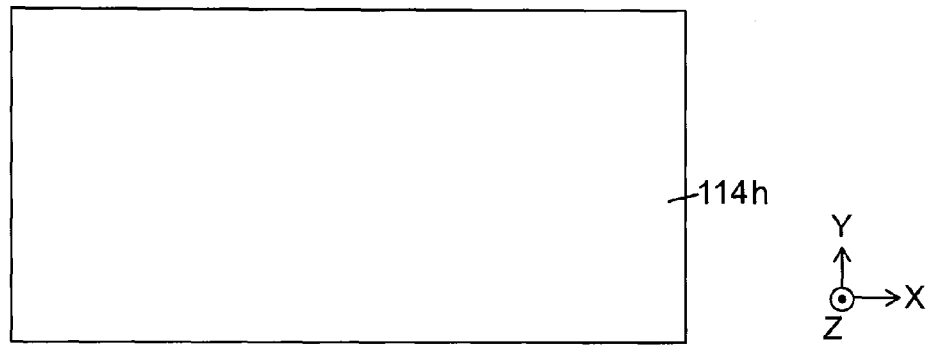
Figure 18B:
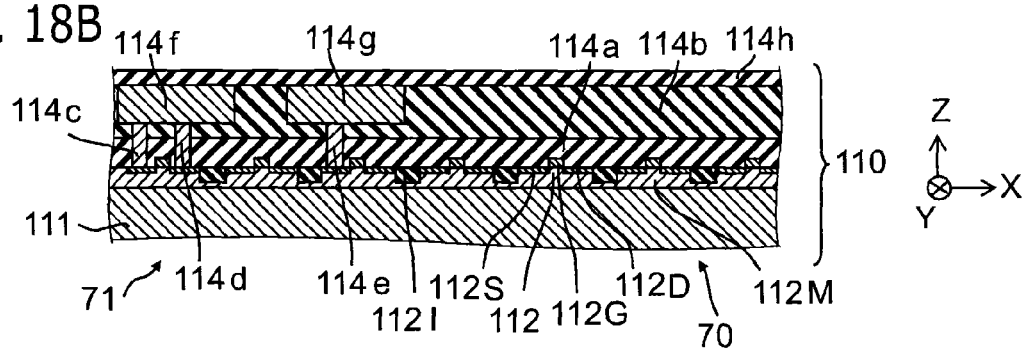

As shown in FIG. 18A and FIG. 18B, a semiconductor layer 112M is provided on the surface portion of the semiconductor substrate 111. A device isolation insulating layer 112I is formed on the top surface of the semiconductor layer 112M. A gate 112G is formed on the semiconductor layer 112M through an insulating layer, not shown. A source 112S and a drain 112D are formed on both sides of the gate 112G to form the transistor 112. An interlayer insulating film 114a is formed on the transistor 112, and an interlayer insulating film 114b is formed.

In the region to be a non-cavity portion 71, trenches and holes are formed in the part of the interlayer insulating films 114a and 114b. A conductive material is filled in the holes to form connecting pillars 114c to 114e. In this example, the connecting pillar 114c is connected to the source 112S of one transistor, and the connecting pillar 114d is connected to the drain 112D. The connecting pillar 114e is connected to the source 112S of another transistor. A conductive material is filled in the trenches to form an interconnecting layer 114f and an interconnecting layer 114g. The interconnecting layer 114f is connected to the connecting pillar 114c and the connecting pillar 114d. The interconnecting layer 114g is connected to the connecting pillar 114e. An interlayer insulating film 114h is formed on the interlayer insulating film 114b.

Figure 19A:
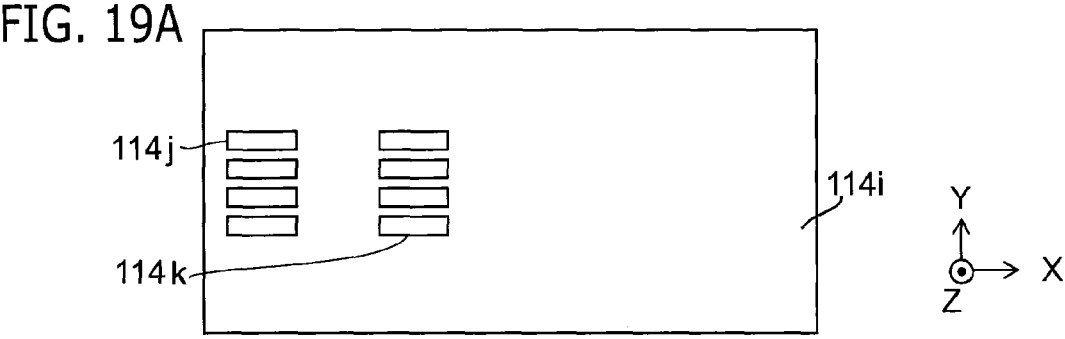
Figure 19B:
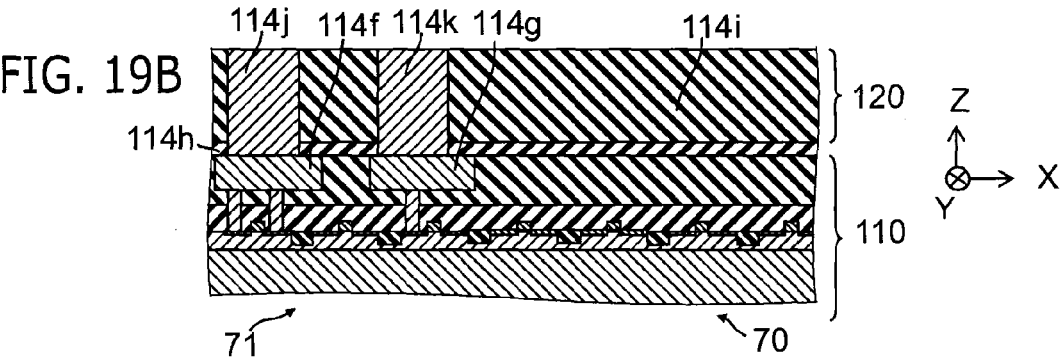

As shown in FIG. 19A and FIG. 19B, $SiO_2$ to be an interlayer insulating film 114i is formed on the interlayer insulating film 114h by CVD (Chemical Vapor Deposition), for example. Holes are formed at predetermined locations on the interlayer insulating film 114i, a conductive material (a metal material) is filled, and the top surface is planarized by CMP for forming a connecting pillar 114j connected to the interconnecting layer 114f and a connecting pillar 114k connected to the interconnecting layer 114g.

Figure 20A:
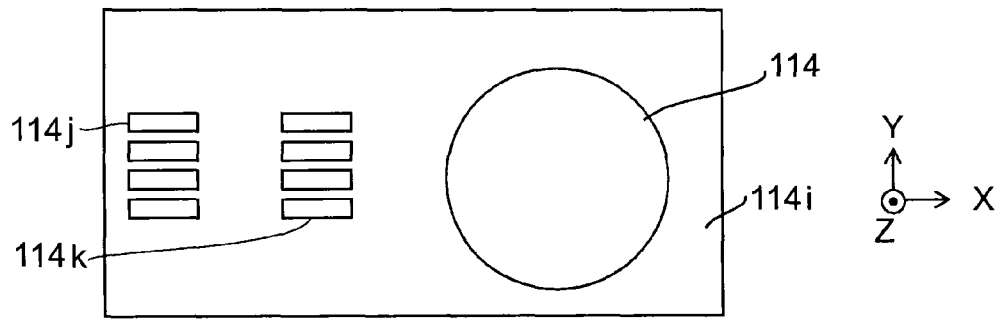
Figure 20B:
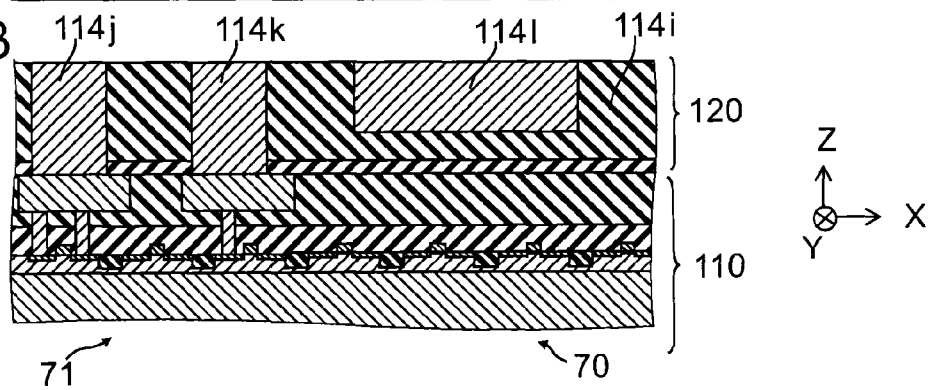

As shown in FIG. 20A and FIG. 20B, a recess is formed in the region to be the caving portion 70 of the interlayer insulating film 114i, and a sacrificial layer 1141 is filled in the recess. SiGe or the like is used for the sacrificial layer 1141, for example. A material that can be formed at low temperature is used for the sacrificial layer 1141.

Figure 21A:
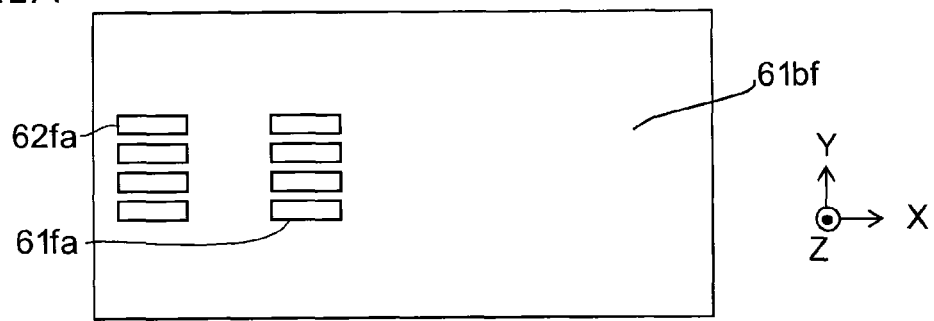
Figure 21B:
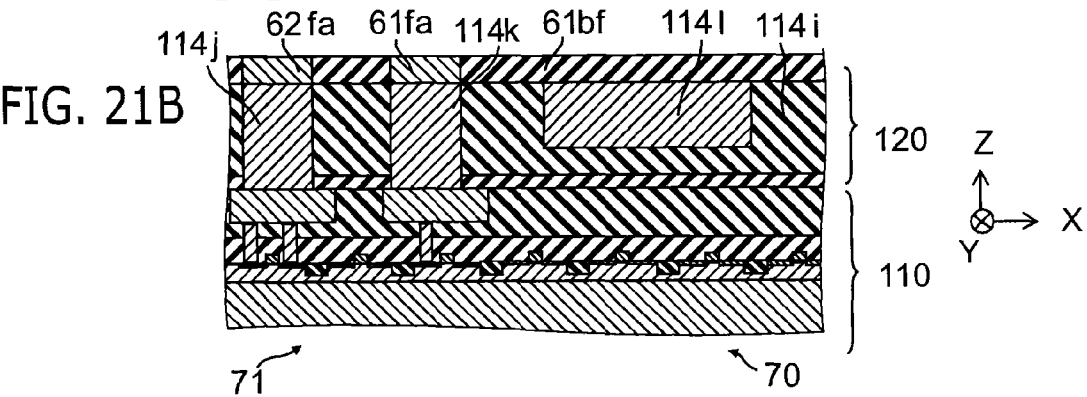

As shown in FIG. 21A and FIG. 21B, an insulating film 61bf (such as $SiO_2$) to be the transducer thin film 64 is formed on the interlayer insulating film 114i and the sacrificial layer 1141. Holes are provided on the insulating film 61bf, a conductive material (a metal) is filled in the holes, and a connecting pillar 61fa and a connecting pillar 62fa are formed. The connecting pillar 61fa is connected to the connecting pillar 114k, and the connecting pillar 62fa is connected to the connecting pillar 114j.

Figure 22A:
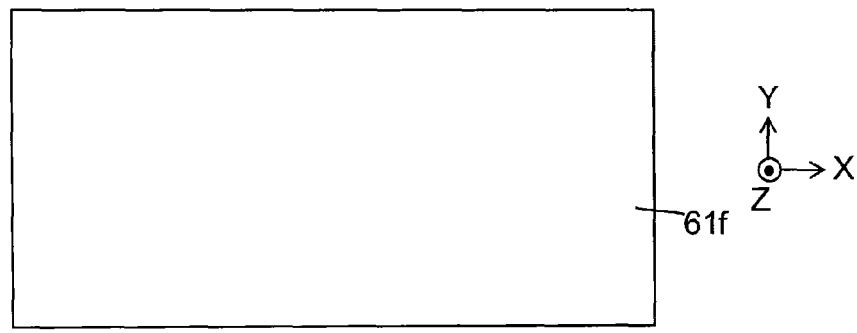
Figure 22B:
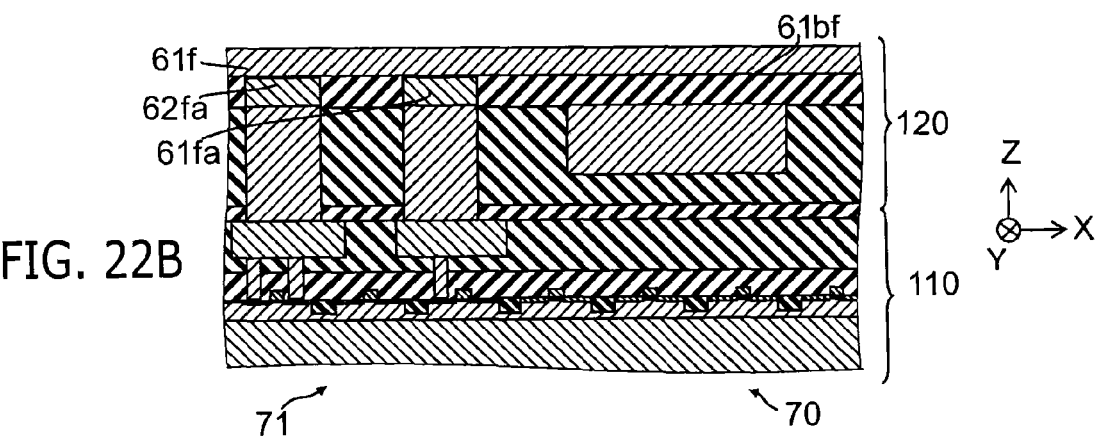

As shown in FIG. 22A and FIG. 22B, the conductive layer 61f to be the first interconnection 61 is formed on the insulating film 61bf, the connecting pillar 61fa, and the connecting pillar 62fa.

Figure 23A:
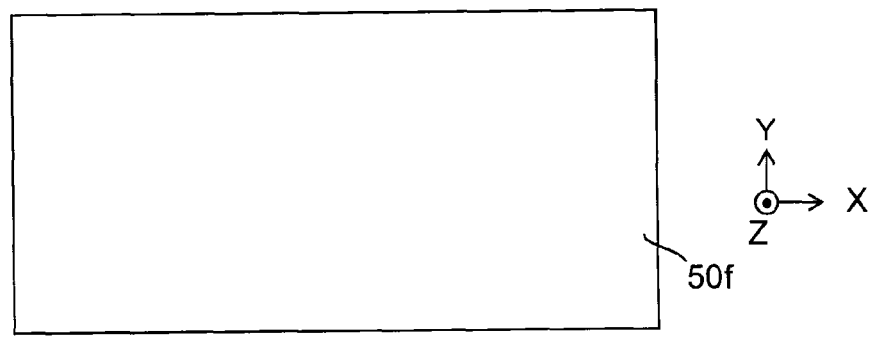
Figure 23B:
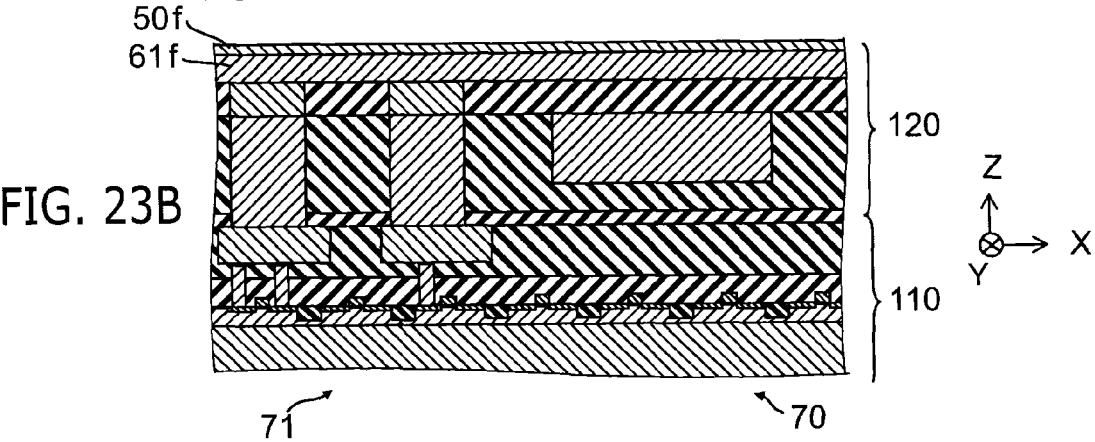

As shown in FIG. 23A and FIG. 23B, a stacked film 50f to be the strain sensing device 50 is formed on the conductive layer 61f.

As shown in FIG. 24A and FIG. 24B, the stacked film 50f is processed in a predetermined shape, and an insulating film 65f (such as $SiO_2$) to be the insulating layer 65 is formed on the stacked film 50f.

As shown in FIG. 25A and FIG. 25B, a part of the insulating film 65f is removed, the conductive layer 61f is processed in a predetermined shape, and the shape of a first interconnection 61 is formed. In the forming, a part of the conductive layer 61f is a connecting pillar 62fb connected to the connecting pillar 62fa. An insulating film 66f to be the insulating layer 66 is formed on the first interconnection 61.

Figure 26A:
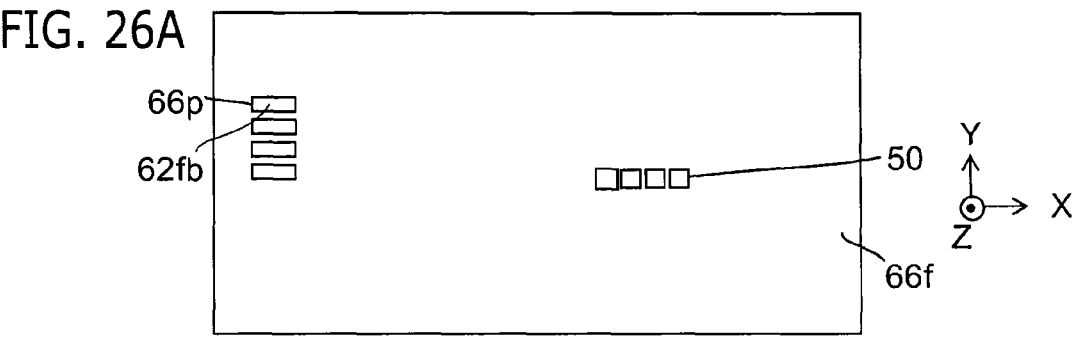
Figure 26B:
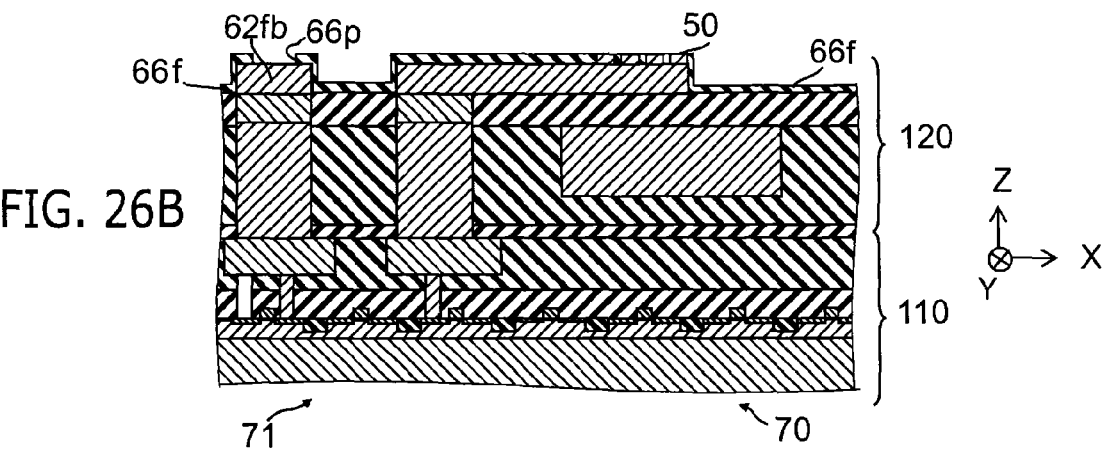

As shown in FIG. 26A and FIG. 26B, an opening 66p is formed on the insulating film 66f, and the connecting pillar 62fb is exposed.

Figure 27A:
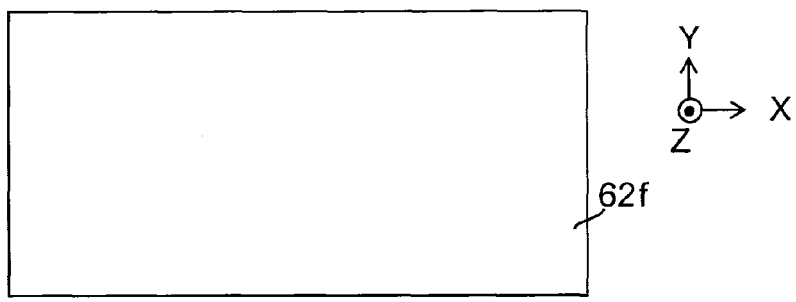
Figure 27B:
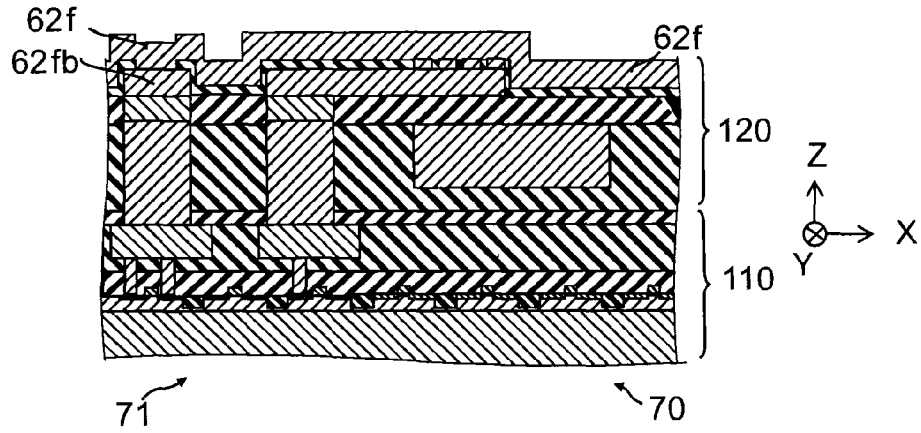

As shown in FIG. 27A and FIG. 27B, the conductive layer 62f to be a second interconnection 62 is formed on the connecting pillar 62fb. A part of the conductive layer 62f is connected to the connecting pillar 62fb.

Figure 28A:
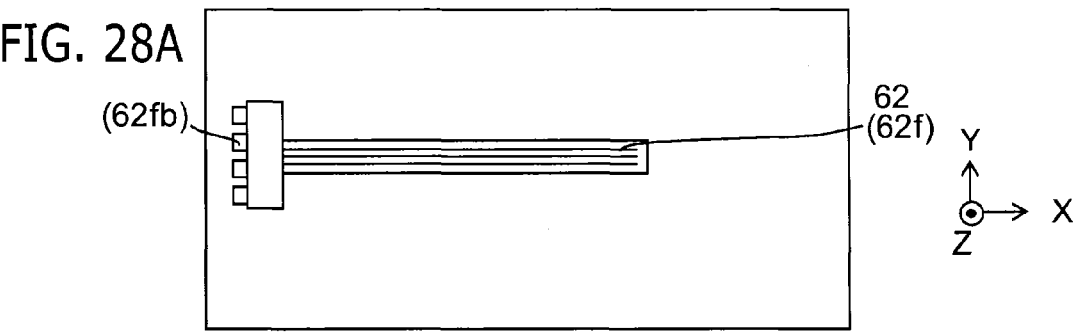
Figure 28B:
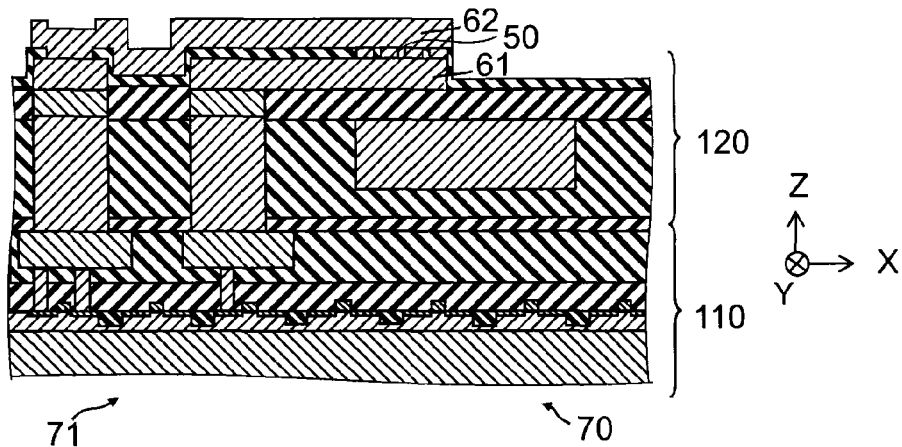

As shown in FIG. 28A and FIG. 28B, the conductive layer 62f is processed in a predetermined shape, and the second interconnection 62 is formed. The second interconnection 62 is connected to the connecting pillar 62fb.

Figure 29A:
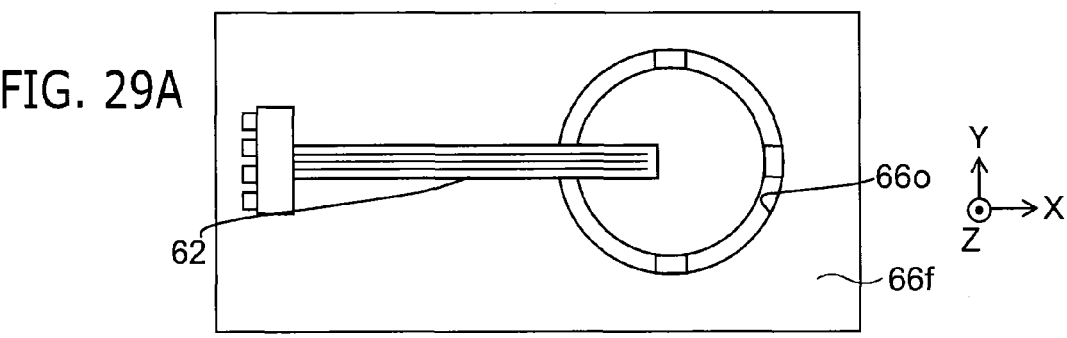
Figure 29B:
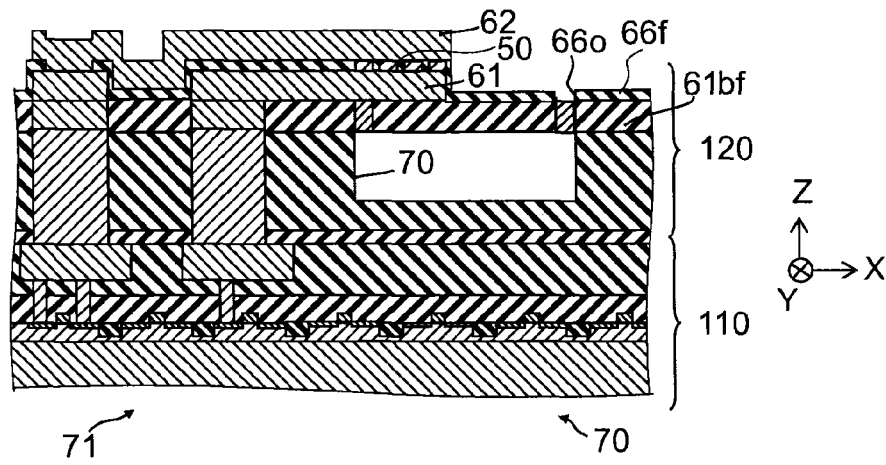

As shown in FIG. 29A and FIG. 29B, an opening 660 in a predetermined shape is formed on the insulating film 66f. The insulating film 61bf is processed through the opening 660, the sacrificial layer 1141 is removed, and the caving portion 70 is formed. In removing the sacrificial layer 1141, the sacrificial layer 1141 is removed (etched, for example) from the top surface of the sacrificial layer 1141 (the surface of the sacrificial layer 1141 opposite the semiconductor substrate 111), for example.

Accordingly, the pressure sensor 360 according to the embodiment can be formed.

In order to form the fixing unit 67 in a ring shape, a portion between the edge of the non-cavity portion 71 and the transducer thin film 64 above the caving portion 70 is filled with an insulating film after the removal, for example.

Figure 30:
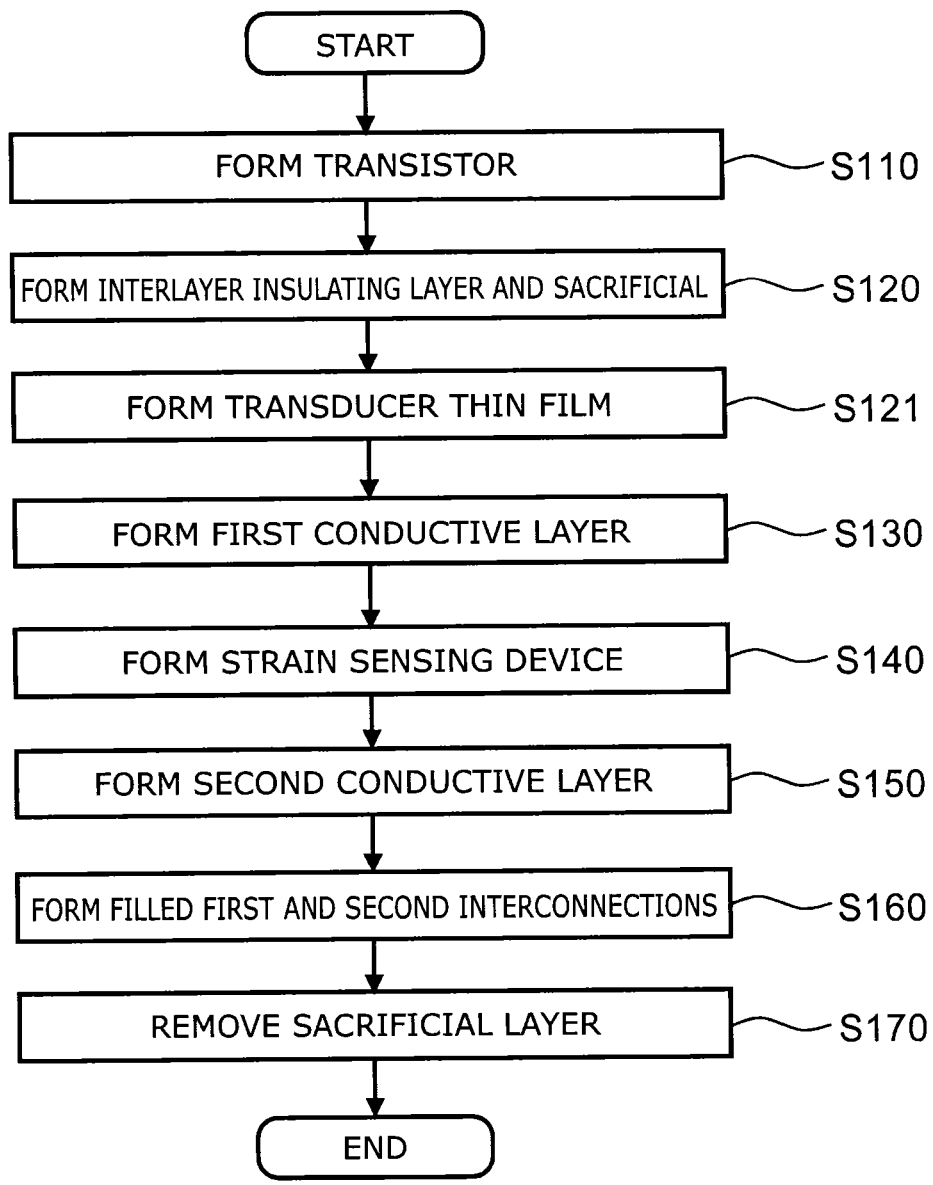
FIG. 30 is a flowchart illustrating a method for manufacturing the pressure sensor according to the seventh embodiment.

FIG. 30 is a flowchart illustrating a method for manufacturing the pressure sensor according to the seventh embodiment.

As shown in FIG. 30, in the method for manufacturing the pressure sensor according to the embodiment, the transistor 112 is formed on the semiconductor substrate 111 (Step S110). For example, the processes described with reference to FIG. 18A and FIG. 18B are performed.

In the manufacturing method, an interlayer insulating layer is formed on the semiconductor substrate 111, and the sacrificial layer 1141 is formed on the transistor 112 (Step S120). For example, the processes described with reference to FIG. 19A to FIG. 20B are performed. This interlayer insulating layer includes the interlayer insulating film 114i, for example.

A thin film to be the transducer thin film 64 (the transducer film 64f, for example) is formed on the interlayer insulating layer (the interlayer insulating film 114i, for example) and the sacrificial layer 1141 (Step S121). The first conductive layer described below sometimes also serves as the transducer thin film 64, as the case may be. In this case, Step S121 is omitted.

The first conductive layer (the conductive layer 61f) to be the first interconnection 61 is formed (Step S130). For example, the processes described with reference to FIG. 22B and FIG. 22B are performed.

The strain sensing device 50 including the first magnetic layer 10 is formed on the first conductive layer (the conductive layer 61f) on the sacrificial layer 1141 (Step S140). For example, the processes described with reference to FIG. 23A to FIG. 24B are performed.

The second conductive layer (the conductive layer 62f) to be the second interconnection 62 is formed on the strain sensing device 50 (Step S150). For example, the processes described with reference to FIG. 27A to FIG. 28B are performed.

A first interconnection 61c electrically connecting the first conductive layer (the conductive layer 61f) to the semiconductor substrate 111 and a second interconnection 62c electrically connecting the second conductive layer (the conductive layer 62f) to the semiconductor substrate 111 are formed in the interlayer insulating layer (Step S160). For example, the processes described with reference to FIG. 18A, FIG. 18B, FIG. 19A, FIG. 19B, FIG. 21A, FIG. 21B, FIG. 25A, and FIG. 25B are performed. Step S160 is performed for one time or multiple times in at least a process step after Step S150 and one of a process step between Step S110 to Step S150.

The sacrificial layer 1141 is then removed (Step S170). For example, the processes described with reference to FIG. 29A and FIG. 29B are performed.

According to the embodiment, a method for manufacturing a highly sensitive pressure sensor can be provided.

The process step of removing the sacrificial layer 1141 (Step S170) includes removing (etching, for example) the sacrificial layer 1141 from the top surface of the sacrificial layer 1141 (from the surface of the sacrificial layer 1141 opposite the semiconductor substrate 111), for example.

Eighth Embodiment

Figure 31:
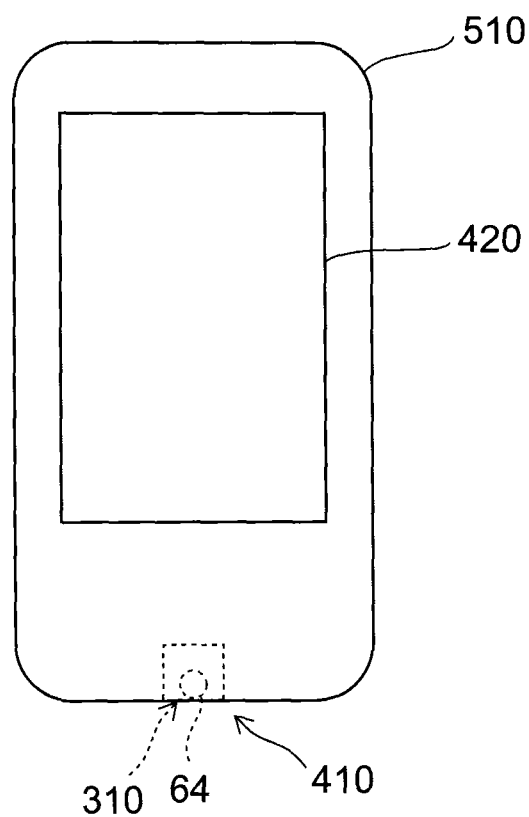
FIG. 31 is a schematic view illustrating a configuration of a microphone according to an eighth embodiment.

FIG. 31 is a schematic view illustrating the configuration of a microphone according to an eighth embodiment.

As shown in FIG. 31, a microphone 410 according to the embodiment includes a given one of the pressure sensors according to the embodiments and the modified pressure sensors. In this example, the pressure sensor 310 is used. The microphone 410 is incorporated at the end of a mobile information terminal 510. The transducer thin film 64 of the pressure sensor 310 in the microphone 410 is substantially parallel with the plane on which a display unit 420 of the mobile information terminal 510 is provided, for example. However, the embodiment is not limited thereto. The disposition of the transducer thin film 64 is optional.

According to the embodiment, the microphone 410 is highly sensitive to a wide frequency band.

Although the microphone 410 is incorporated in the mobile information terminal 510, the embodiment is not limited thereto. The microphone 410 may be incorporated in an IC recorder, a pin microphone, or the like, for example.

According to the embodiment, a highly sensitive pressure sensor and a microphone can be provided.

As described above, the embodiments of the invention are described with reference to specific examples. However, the embodiments of the invention are not limited to these specific examples. For example, the specific configurations of the components such as the base, the sensor unit, the transducer thin film, the fixing unit, the strain sensing device, the magnetic layer, the intermediate layer, and the processing circuit included in the pressure sensor and the microphone are incorporated in the scope of the invention as long as a person skilled in the art appropriately selects components from the publicly known range to similarly implement the invention for obtaining the similar effect.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A pressure sensor comprising:
   a base; and
   a first sensor unit provided on the base,
   the first sensor unit including:
      a first transducer thin film having a first membrane surface, the first transducer thin film being flexible;
      a first strain sensing device provided at a location on the first membrane surface different from a location of a barycenter of the first membrane surface, the first strain sensing device including a first magnetic layer, a second magnetic layer, and a first intermediate layer provided between the first magnetic layer and the second magnetic layer, the first intermediate layer being nonmagnetic; and
      a second strain sensing device provided apart from the first strain sensing device on the first membrane surface and provided at a location different from the location of the barycenter, the second strain sensing device including a third magnetic layer, a fourth magnetic layer, and a second intermediate layer provided between the third magnetic layer and the fourth magnetic layer, the second intermediate layer being nonmagnetic,
   the second strain sensing device being disposed between the first strain sensing device and the barycenter.

2. The sensor according to claim 1, wherein the first sensor unit further includes a fixing unit connected to an edge portion of the first transducer thin film and configured to fix the edge portion to the base.

3. The sensor according to claim 2, wherein the fixing unit fixes a part of the edge portion of the first transducer thin film to the base, and the part is located in a straight line passing the first strain sensing device, the second strain sensing device and the barycenter.

4. The sensor according to claim 2, wherein the fixing unit continuously fixes the edge portion of the first transducer thin film to the base.

5. The sensor according to claim 1, wherein the second strain sensing device and the first strain sensing device are arranged along an edge portion of the first membrane surface.

6. The sensor according to claim 1, wherein
   a magnetization direction of the third magnetic layer is along one of a magnetization direction of the first magnetic layer and a magnetization direction of the second magnetic layer, and
   a magnetization direction of the fourth magnetic layer is along the other of the magnetization direction of the first magnetic layer and the magnetization direction of the second magnetic layer.

7. The sensor according to claim 1, further comprising a processing circuit configured to process a first signal obtained from the first strain sensing device and a second signal obtained from the second strain sensing device.

8. The sensor according to claim 7, wherein the processing circuit is configured to perform at least one of an adding process of the first signal and the second signal, a subtracting process of the first signal and the second signal, and a multiplying process of the first signal and the second signal.

9. The sensor according to claim 1, wherein
   a length of the first strain sensing device along a direction perpendicular to a direction from the first magnetic layer toward the second magnetic layer is 0.5 µm or more and 20 µm or less, and
   a length of the second strain sensing device along a direction perpendicular to the direction from the first magnetic layer toward the second magnetic layer is 0.5 µm or more and 20 µm or less.

10. The sensor according to claim 1, further comprising a second sensor unit provided at a location on the base different from a location of the first sensor unit,
    the second sensor unit including:
       a second transducer thin film having a second membrane surface, the second transducer thin film being flexible; and
       a third strain sensing device provided on the second membrane surface, the third strain sensing device including a fifth magnetic layer, a sixth magnetic layer, and a third intermediate layer provided between the fifth magnetic layer and the sixth magnetic layer, the third intermediate layer being nonmagnetic,
    a width of the second transducer thin film passing through a barycenter of the second membrane surface of the second transducer thin film along a direction parallel with the second membrane surface being different from a width of the first transducer thin film passing through the barycenter of the first membrane surface of the first transducer thin film along a direction parallel with the first membrane surface.

11. The sensor according to claim 1, wherein
    the first sensor unit further includes
       a third strain sensing device provided at a location on the first membrane surface different from the location of the barycenter of the first membrane surface, the third strain sensing device including a fifth magnetic layer, a sixth magnetic layer, and a third intermediate layer provided between the fifth magnetic layer and the sixth magnetic layer, the third intermediate layer being nonmagnetic; and
       a fourth strain sensing device provided apart from the third strain sensing device on the first membrane surface and provided at a location different from the location of the barycenter, the fourth strain sensing device including a seventh magnetic layer, an eighth magnetic layer, and a fourth intermediate layer provided between the seventh magnetic layer and the eighth magnetic layer, the fourth intermediate layer being nonmagnetic,
    the fourth strain sensing device is disposed between the third strain sensing device and the barycenter,
    a straight line passing the first strain sensing device and the barycenter crosses a straight line passing the third strain sensing device and the barycenter.

12. A pressure sensor comprising:
a base;
a first sensor unit provided on the base; and
a processing circuit,
the first sensor unit including:
- a first transducer thin film having a first membrane surface, the first transducer thin film being flexible;
- a first strain sensing device provided at a location on the first membrane surface different from a location of a barycenter of the first membrane surface, the first strain sensing device including a first magnetic layer, a second magnetic layer, and a first intermediate layer provided between the first magnetic layer and the second magnetic layer, the first intermediate layer being nonmagnetic; and
- a second strain sensing device provided apart from the first strain sensing device on the first membrane surface and provided at a location different from the location of the barycenter, the second strain sensing device including a third magnetic layer, a fourth magnetic layer, and a second intermediate layer provided between the third magnetic layer and the fourth magnetic layer, the second intermediate layer being nonmagnetic,
a distance between the first strain sensing device and the barycenter being the same as a distance between the second strain sensing device and the barycenter,
a first straight line passing the first strain sensing device and the barycenter being oblique with respect to the a second straight line passing the second strain sensing and the barycenter,
a magnetization direction of the third magnetic layer being along one of a magnetization direction of the first magnetic layer and a magnetization direction of the second magnetic layer,
a magnetization direction of the fourth magnetic layer being along the other of the magnetization direction of the first magnetic layer and the magnetization direction of the second magnetic layer,
the processing circuit being configured to process a first signal obtained from the first strain sensing device and a second signal obtained from the second strain sensing device, and
the processing circuit being configured to perform at least one of an adding process of the first signal and the second signal, a subtracting process of the first signal and the second signal, and a multiplying process of the first signal and the second signal.

13. The sensor according to claim 12, wherein the first sensor unit further includes a fixing unit connected to an edge portion of the first transducer thin film and configured to fix the edge portion to the base.

14. The sensor according to claim 13, wherein the fixing unit fixes a plurality of portions of the edge portion of the first transducer thin film to the base, the portions being symmetric to the barycenter.

15. The sensor according to claim 13, wherein the fixing unit continuously fixes the edge portion of the first transducer thin film to the base.

16. The sensor according to claim 12, wherein the second strain sensing device and the first strain sensing device are arranged along an edge portion of the first membrane surface.

17. The sensor according to claim 12, wherein
a length of the first strain sensing device along a direction perpendicular to a direction from the first magnetic layer toward the second magnetic layer is 0.5 μm or more and 20 μm or less, and
a length of the second strain sensing device along a direction perpendicular to the direction from the first magnetic layer toward the second magnetic layer is 0.5 μm or more and 20 μm or less.

18. The sensor according to claim 12, further comprising a second sensor unit provided at a location on the base different from a location of the first sensor unit,
the second sensor unit including:
- a second transducer thin film having a second membrane surface, the second transducer thin film being flexible; and
- a third strain sensing device provided on the second membrane surface, the third strain sensing device including a fifth magnetic layer, a sixth magnetic layer, and a third intermediate layer provided between the fifth magnetic layer and the sixth magnetic layer, the third intermediate layer being nonmagnetic,
a width of the second transducer thin film passing through a barycenter of the second membrane surface of the second transducer thin film along a direction parallel with the second membrane surface being different from a width of the first transducer thin film passing through the barycenter of the first membrane surface of the first transducer thin film along a direction parallel with the first membrane surface.

19. A pressure sensor comprising:
a base;
a first sensor unit provided on the base; and
a processing circuit,
the first sensor unit including:
- a first transducer thin film having a first membrane surface, the first transducer thin film being flexible;
- a first strain sensing device provided at a location on the first membrane surface different from a location of a barycenter of the first membrane surface, the first strain sensing device including a first magnetic layer, a second magnetic layer, and a first intermediate layer provided between the first magnetic layer and the second magnetic layer, the first intermediate layer being nonmagnetic; and
- a second strain sensing device provided apart from the first strain sensing device on the first membrane surface and provided at a location different from the location of the barycenter, the second strain sensing device including a third magnetic layer, a fourth magnetic layer, and a second intermediate layer provided between the third magnetic layer and the fourth magnetic layer, the second intermediate layer being nonmagnetic,
the processing circuit being configured to process a first signal obtained from the first strain sensing device and a second signal obtained from the second strain sensing device, and
the processing circuit being configured to perform at least one of an adding process of the first signal and the second signal, a subtracting process of the first signal and the second signal, and a multiplying process of the first signal and the second signal.

20. The sensor according to claim 19, wherein the first sensor unit further includes a fixing unit connected to an edge portion of the first transducer thin film and configured to fix the edge portion to the base.

21. The sensor according to claim 20, wherein the fixing unit fixes a part of the edge portion of the first transducer thin film to the base and the part is located in a straight line passing the first strain sensing device, the second strain sensing device and the barycenter.

22. The sensor according to claim 20, wherein the fixing unit continuously fixes the edge portion of the first transducer thin film to the base.

23. The sensor according to claim 19, wherein the second strain sensing device and the first strain sensing device are arranged along an edge portion of the first membrane surface.

24. The sensor according to claim 19, wherein
a magnetization direction of the third magnetic layer is along one of a magnetization direction of the first magnetic layer and a magnetization direction of the second magnetic layer, and
a magnetization direction of the fourth magnetic layer is along the other of the magnetization direction of the first magnetic layer and the magnetization direction of the second magnetic layer.

25. The sensor according to claim 19, wherein
a length of the first strain sensing device along a direction perpendicular to a direction from the first magnetic layer toward the second magnetic layer is 0.5 μm or more and 20 μm or less, and
a length of the second strain sensing device along a direction perpendicular to the direction from the first magnetic layer toward the second magnetic layer is 0.5 μm or more and 20 μm or less.

26. The sensor according to claim 19, further comprising a second sensor unit provided at a location on the base different from a location of the first sensor unit,
the second sensor unit including:
a second transducer thin film having a second membrane surface, the second transducer thin film being flexible; and
a third strain sensing device provided on the second membrane surface, the third strain sensing device including a fifth magnetic layer, a sixth magnetic layer, and a third intermediate layer provided between the fifth magnetic layer and the sixth magnetic layer, the third intermediate layer being nonmagnetic,
a width of the second transducer thin film passing through a barycenter of the second membrane surface of the second transducer thin film along a direction parallel with the second membrane surface being different from a width of the first transducer thin film passing through the barycenter of the first membrane surface of the first transducer thin film along a direction parallel with the first membrane surface.

27. A microphone comprising a pressure sensor including:
a base; and
a first sensor unit provided on the base,
the first sensor unit including:
a first transducer thin film having a first membrane surface, the first transducer thin film being flexible;
a first strain sensing device provided at a location on the first membrane surface different from a location of a barycenter of the first membrane surface, the first strain sensing device including a first magnetic layer, a second magnetic layer, and a first intermediate layer provided between the first magnetic layer and the second magnetic layer, the first intermediate layer being nonmagnetic; and
a second strain sensing device provided apart from the first strain sensing device on the first membrane surface and provided at a location different from the location of the barycenter, the second strain sensing device including a third magnetic layer, a fourth magnetic layer, and a second intermediate layer provided between the third magnetic layer and the fourth magnetic layer, the second intermediate layer being nonmagnetic,
the second strain sensing device being disposed between the first strain sensing device and the barycenter.

28. A microphone comprising a pressure sensor including:
a base;
a first sensor unit provided on the base; and
a processing circuit,
the first sensor unit including:
a first transducer thin film having a first membrane surface, the first transducer thin film being flexible;
a first strain sensing device provided at a location on the first membrane surface different from a location of a barycenter of the first membrane surface, the first strain sensing device including a first magnetic layer, a second magnetic layer, and a first intermediate layer provided between the first magnetic layer and the second magnetic layer, the first intermediate layer being nonmagnetic; and
a second strain sensing device provided apart from the first strain sensing device on the first membrane surface and provided at a location different from the location of the barycenter, the second strain sensing device including a third magnetic layer, a fourth magnetic layer, and a second intermediate layer provided between the third magnetic layer and the fourth magnetic layer, the second intermediate layer being nonmagnetic,
a distance between the first strain sensing device and the barycenter being the same as a distance between the second strain sensing device and the barycenter,
a first straight line passing the first strain sensing device and the barycenter being oblique with respect to the a second straight line passing the second strain sensing device and the barycenter,
a magnetization direction of the third magnetic layer being along one of a magnetization direction of the first magnetic layer and a magnetization direction of the second magnetic layer,
a magnetization direction of the fourth magnetic layer being along the other of the magnetization direction of the first magnetic layer and the magnetization direction of the second magnetic layer,
the processing circuit being configured to process a first signal obtained from the first strain sensing device and a second signal obtained from the second strain sensing device, and
the processing circuit being configured to perform at least one of an adding process of the first signal and the second signal, a subtracting process of the first signal and the second signal, and a multiplying process of the first signal and the second signal.

29. A microphone comprising a pressure sensor including:
a base;
a first sensor unit provided on the base; and
a processing circuit,
the first sensor unit including:
a first transducer thin film having a first membrane surface, the first transducer thin film being flexible;
a first strain sensing device provided at a location on the first membrane surface different from a location of a barycenter of the first membrane surface, the first strain sensing device including a first magnetic layer, a second magnetic layer, and a first intermediate layer provided between the first magnetic layer and the second magnetic layer, the first intermediate layer being nonmagnetic; and a second strain sensing device provided apart from the first strain sensing device on the first membrane surface and provided at a location different from the location of the barycenter, the second strain sensing device including a third magnetic layer, a fourth magnetic layer, and a second intermediate layer provided between the third magnetic layer and the fourth magnetic layer, the second intermediate layer being nonmagnetic, the processing circuit being configured to process a first signal obtained from the first strain sensing device and a second signal obtained from the second strain sensing device, and the processing circuit being configured to perform at least one of an adding process of the first signal and the second signal, a subtracting process of the first signal and the second signal, and a multiplying process of the first signal and the second signal.

30. A pressure sensor comprising:

a base; and a first sensor unit provided on the base, the first sensor unit including:

a first transducer thin film having a first membrane surface, the first transducer thin film being flexible;

a first strain sensing device provided at a location on the first membrane surface different from a location of a barycenter of the first membrane surface, the first strain sensing device including a first magnetic layer, a second magnetic layer, and a first intermediate layer provided between the first magnetic layer and the second magnetic layer, the first intermediate layer being nonmagnetic; and a second strain sensing device provided apart from the first strain sensing device on the first membrane surface and provided at a location different from the location of the barycenter, the second strain sensing device including a third magnetic layer, a fourth magnetic layer, and a second intermediate layer provided between the third magnetic layer and the fourth magnetic layer, the second intermediate layer being nonmagnetic, the second strain sensing device being disposed between the first strain sensing device and the barycenter, wherein the first sensor unit further includes a fixing unit connected to an edge portion of the first transducer thin film and configured to fix the edge portion to the base, and the fixing unit continuously fixes the edge portion of the first transducer thin film to the base.

31. A pressure sensor comprising:

a base; and a first sensor unit provided on the base, the first sensor unit including:

a first transducer thin film having a first membrane surface, the first transducer thin film being flexible;

a first strain sensing device provided at a location on the first membrane surface different from a location of a barycenter of the first membrane surface, the first strain sensing device including a first magnetic layer, a second magnetic layer, and a first intermediate layer provided between the first magnetic layer and the second magnetic layer, the first intermediate layer being nonmagnetic; and a second strain sensing device provided apart from the first strain sensing device on the first membrane surface and provided at a location different from the location of the barycenter, the second strain sensing device including a third magnetic layer, a fourth magnetic layer, and a second intermediate layer provided between the third magnetic layer and the fourth magnetic layer, the second intermediate layer being nonmagnetic, a distance between the first strain sensing device and the barycenter being the same as a distance between the second strain sensing device and the barycenter, wherein the first sensor unit further includes a fixing unit connected to an edge portion of the first transducer thin film and configured to fix the edge portion to the base, and the fixing unit continuously fixes the edge portion of the first transducer thin film to the base.

32. A pressure sensor comprising:

a base;

a first sensor unit provided on the base; and a processing circuit, the first sensor unit including:

a first transducer thin film having a first membrane surface, the first transducer thin film being flexible;

a first strain sensing device provided at a location on the first membrane surface different from a location of a barycenter of the first membrane surface, the first strain sensing device including a first magnetic layer, a second magnetic layer, and a first intermediate layer provided between the first magnetic layer and the second magnetic layer, the first intermediate layer being nonmagnetic; and a second strain sensing device provided apart from the first strain sensing device on the first membrane surface and provided at a location different from the location of the barycenter, the second strain sensing device including a third magnetic layer, a fourth magnetic layer, and a second intermediate layer provided between the third magnetic layer and the fourth magnetic layer, the second intermediate layer being nonmagnetic, the processing circuit being configured to process a first signal obtained from the first strain sensing device and a second signal obtained from the second strain sensing device, and the processing circuit being configured to perform at least one of an adding process of the first signal and the second signal, a subtracting process of the first signal and the second signal, and a multiplying process of the first signal and the second signal, wherein the first sensor unit further includes a fixing unit connected to an edge portion of the first transducer thin film and configured to fix the edge portion to the base, and wherein the fixing unit continuously fixes the edge portion of the first transducer thin film to the base.

* * * * *